(12) United States Patent
Yamazaki

(10) Patent No.: US 11,504,916 B2
(45) Date of Patent: Nov. 22, 2022

(54) THREE-DIMENSIONAL SHAPING APPARATUS AND THREE-DIMENSIONAL SHAPED ARTICLE PRODUCTION METHOD

(71) Applicant: SEIKO EPSON CORPORATION, Tokyo (JP)

(72) Inventor: Shigeru Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1 day.

(21) Appl. No.: 17/239,725

(22) Filed: Apr. 26, 2021

(65) Prior Publication Data

US 2021/0331419 A1    Oct. 28, 2021

(30) Foreign Application Priority Data

Apr. 27, 2020 (JP) .............................. JP2020-078140

(51) Int. Cl.
| | | |
|---|---|---|
| *B29C 64/393* | (2017.01) | |
| *B29C 64/118* | (2017.01) | |
| *B29C 64/295* | (2017.01) | |
| *B33Y 50/02* | (2015.01) | |
| *B33Y 10/00* | (2015.01) | |

(Continued)

(52) U.S. Cl.
CPC .......... *B29C 64/393* (2017.08); *B29C 64/118* (2017.08); *B29C 64/209* (2017.08); *B29C 64/295* (2017.08); *B33Y 10/00* (2014.12); *B33Y 30/00* (2014.12); *B33Y 50/02* (2014.12)

(58) Field of Classification Search
CPC ... B29C 64/393; B29C 64/118; B29C 64/295; B29C 64/209; B33Y 10/00; B33Y 30/00; B33Y 50/02
See application file for complete search history.

(56) References Cited

U.S. PATENT DOCUMENTS

| | | | | |
|---|---|---|---|---|
| 6,332,355 B1 * | 12/2001 | Totani | ..................... | F16H 57/01 |
| | | | | 73/162 |
| 6,846,438 B2 * | 1/2005 | Suzuki | ..................... | B29C 45/76 |
| | | | | 425/162 |
| 2016/0114535 A1 | 4/2016 | Kirchman et al. | | |

FOREIGN PATENT DOCUMENTS

JP    2018-001586 A    1/2018

* cited by examiner

*Primary Examiner* — Joseph S Del Sole
*Assistant Examiner* — John Robitaille
(74) *Attorney, Agent, or Firm* — Global IP Counselors, LLP

(57) ABSTRACT

A three-dimensional shaping apparatus includes a plasticizing section that includes a drive motor, a heater, and a screw rotated by the drive motor and that plasticizes a material to form a shaping material, a moving mechanism section that changes a relative position of an ejection section that ejects the shaping material toward a stage to the stage, a state observation section that observes a state of the drive motor or the heater, a prediction section that predicts a service life arrival time of the drive motor or the heater from an observation result of the state observation section, a notification section, and a control unit that controls the plasticizing section and the moving mechanism section to shape a three-dimensional shaped article based on shaping data. The control unit determines whether or not the service life arrival time is within a shaping time estimated based on the shaping data, and makes a notification of service life information representing a result of service life determination by controlling the notification section before shaping the three-dimensional shaped article when the service life arrival time is within the shaping time.

9 Claims, 20 Drawing Sheets

(51) Int. Cl.
*B33Y 30/00* (2015.01)
*B29C 64/209* (2017.01)

THREE-DIMENSIONAL SHAPING APPARATUS AND THREE-DIMENSIONAL SHAPED ARTICLE PRODUCTION METHOD

The present application is based on, and claims priority from JP Application Serial Number 2020-078140, filed on Apr. 27, 2020, the disclosure of which is hereby incorporated by reference herein in its entirety.

BACKGROUND

1. Technical Field

The present disclosure relates to a three-dimensional shaping apparatus and a three-dimensional shaped article production method.

2. Related Art

With respect to a three-dimensional shaping apparatus, an apparatus for shaping a shaped article by curing a resin through irradiation with a UV light is disclosed in US Patent Application Publication No. 2016/0114535 (Patent Document 1). In the apparatus, when the output of the UV light is decreased due to deterioration over time, and a target output value is not reached even if the electric power supply to the UV light is increased, a user is urged to replace a part constituting the UV light.

As in the above document, when a part of a three-dimensional shaping apparatus is deteriorated over time, the part deteriorated over time is, for example, replaced by a user. However, depending on the degree of deterioration over time, a part arrives at the end of its service life in the middle of shaping of a shaped article, and the part is required to be replaced in the middle of shaping in some cases. When a part is replaced in the middle of shaping, there is a possibility that deterioration of shaping quality due to suspension or resumption of shaping may occur.

SUMMARY

According to a first aspect of the present disclosure, a three-dimensional shaping apparatus is provided. The three-dimensional shaping apparatus includes a plasticizing section that includes a drive motor, a heater, and a screw rotated by the drive motor and that plasticizes a material to form a shaping material, an ejection section that ejects the shaping material toward a stage, a moving mechanism section that changes a relative position of the ejection section to the stage, a state observation section that observes a state of the drive motor or the heater, a prediction section that predicts a service life arrival time of the drive motor or the heater from an observation result of the state observation section, a notification section, and a control unit that controls the plasticizing section and the moving mechanism section to shape a three-dimensional shaped article based on shaping data. The control unit makes service life determination to determine whether or not the service life arrival time predicted by the prediction section is within a shaping time estimated based on the shaping data, and makes a notification of service life information representing a result of the service life determination by controlling the notification section before shaping the three-dimensional shaped article when the service life arrival time is within the shaping time.

According to a second aspect of the present disclosure, a three-dimensional shaped article production method for shaping a three-dimensional shaped article by plasticizing a material to form a shaping material using a plasticizing section including a drive motor, a heater, and a screw rotated by the drive motor and ejecting the shaping material from an ejection section toward a stage is provided. The production method includes a first step of observing a state of the drive motor or the heater, a second step of predicting a service life arrival time of the drive motor or the heater from an observation result of the state, a third step of making service life determination to determine whether or not the predicted service life arrival time is within a shaping time estimated based on shaping data, a fourth step of making a notification of service life information that is a result of the service life determination before shaping the three-dimensional shaped article when the service life arrival time is within the shaping time, and a fifth step of shaping the three-dimensional shaped article by controlling the plasticizing section and a moving mechanism section that changes a relative position of the ejection section to the stage according to the shaping data.

DESCRIPTION OF EXEMPLARY EMBODIMENTS

A. First Embodiment

Figure 1:
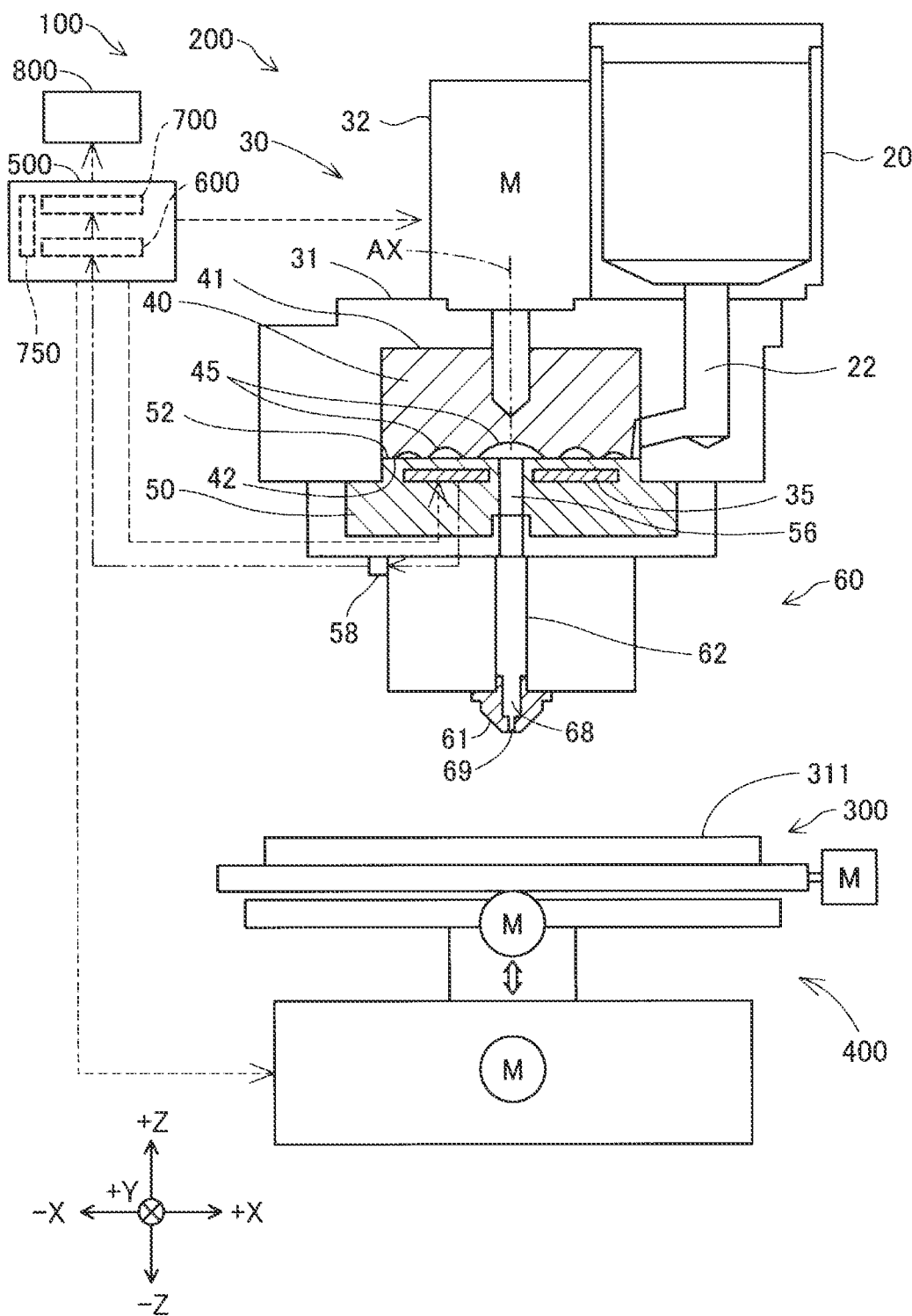
FIG. 1 is a view showing a schematic configuration of a three-dimensional shaping apparatus according to a first embodiment.

FIG. 1 is a view showing a schematic configuration of a three-dimensional shaping apparatus 100 according to this embodiment. In FIG. 1, arrows along X, Y, and Z directions orthogonal to one another are illustrated. The X, Y, and Z directions are directions along an X axis, a Y axis, and a Z axis that are three spatial axes orthogonal to one another, and each include both a direction at one side along the X axis, Y axis, and Z axis and an opposite direction thereto. The X axis and Y axis are axes along a horizontal plane, and the Z axis is an axis along a vertical line. In other drawings, arrows along the X, Y, and Z directions are also illustrated as appropriate. The X, Y, and Z directions in FIG. 1 and the X, Y, and Z directions in the other drawings indicate the same directions, respectively. In the following description, when the direction is specified, the positive direction is denoted by "+", and the negative direction is denoted by "−", and the plus and minus symbols are used together with the indication of the direction.

The three-dimensional shaping apparatus 100 in this embodiment includes a shaping unit 200, a stage 300, a moving mechanism section 400, a control unit 500, and a notification section 800. The three-dimensional shaping apparatus 100 shapes a three-dimensional shaped article having a desired shape on a shaping face 311 of the stage 300 by changing the relative position of an ejection section 60 of the shaping unit 200 to the stage 300 by driving the moving mechanism section 400 while ejecting a shaping material from the ejection section 60 toward the stage 300 under the control of the control unit 500. Note that the shaping material is sometimes referred to as "molten material".

The moving mechanism section 400 changes the relative position of the ejection section 60 to the stage 300. In this embodiment, the moving mechanism section 400 changes the relative position of the ejection section 60 to the stage 300 by moving the stage 300 with respect to the shaping unit 200. Note that the relative positional change of the ejection section 60 to the stage 300 is sometimes simply referred to as "movement of the ejection section 60". In this embodiment, for example, "to move the stage 300 in the +X direction" can also be expressed in other words as "to move the ejection section 60 in the −X direction". In addition, the relative moving speed of the ejection section 60 to the stage 300 is sometimes simply referred to as "moving speed".

The moving mechanism section 400 in this embodiment is constituted by a three-axis positioner for moving the stage 300 in three axis directions of the X, Y, and Z directions by the driving forces of three motors. Each motor drives under the control of the control unit 500. The moving mechanism section 400 need not be configured to move the stage 300, but may be configured to move the ejection section 60 without moving the stage 300. In addition, the moving mechanism section 400 may be configured to move both the stage 300 and the ejection section 60.

The shaping unit 200 includes a material supply section 20 that is a supply source of a material, a plasticizing section 30 that melts a material supplied from the material supply section 20 to forma shaping material, and the ejection section 60 that ejects the shaping material.

In the material supply section 20, a material in a state of a pellet, a powder, or the like is stored. In this embodiment, a resin formed into a pellet shape is used as the material. The material supply section 20 in this embodiment is constituted by a hopper. A supply channel 22 that couples the material supply section 20 to the plasticizing section 30 is provided below the material supply section 20. The material supply section 20 supplies the material to the plasticizing section 30 through the supply channel 22. The details of the material will be described later.

The plasticizing section 30 includes a drive motor 32, a heater 35, and a screw 40. The plasticizing section 30 of this embodiment further includes a screw case 31 and a barrel 50. The plasticizing section 30 plasticizes at least a portion of a material supplied from the material supply section 20 to form a shaping material in a paste form having fluidity and supplies the shaping material to the ejection section 60. The "plasticizing" means melting by applying heat to a material having thermoplasticity. The "melting" not only means transforming a material having thermoplasticity into a liquid by heating the material to a temperature equal to or higher than the melting point, but also means softening a material having thermoplasticity by heating the material to a temperature equal to or higher than the glass transition point so as to exhibit fluidity. The screw 40 of this embodiment is a so-called flat screw and is sometimes referred to as "scroll".

The screw case 31 is a housing for housing the screw 40. To a lower face of the screw case 31, the barrel 50 is fixed, and the screw 40 is housed in a space surrounded by the screw case 31 and the barrel 50. To an upper face of the screw case 31, the drive motor 32 is fixed.

The screw 40 has a substantially columnar shape whose height in a direction along its central axis RX is smaller than the diameter. The screw 40 has a grooved face 42 having a groove formed therein at a face opposed to the barrel 50. Specifically, the grooved face 42 is opposed to a screw opposed face 52 of the barrel 50 to be described later. The central axis RX of this embodiment coincides with the rotational axis of the screw 40. Further, the details of the configuration of the screw 40 at the grooved face 42 side will be described later.

The drive motor 32 is coupled to a face at an opposite side to the grooved face 42 of the screw 40. The screw 40 is rotated around the central axis RX by a torque generated by rotation of the drive motor 32. The drive motor 32 is driven under the control of the control unit 500. The drive motor 32 need not be directly coupled to the screw 40. For example, the screw 40 and the drive motor 32 may be coupled through a decelerator. In that case, for example, the drive motor 32 may be coupled to a planetary gear of a decelerator having a planetary gear mechanism, and the screw 40 may be coupled to a sun gear.

The barrel 50 is disposed below the screw 40 so as to be opposed to the grooved face 42 of the screw 40. The barrel 50 has the screw opposed face 52 opposed to the grooved face 42 of the screw 40. The barrel 50 is provided with a communication hole 56 on the central axis RX of the screw 40. The shaping material formed by the plasticizing section 30 is supplied to the ejection section 60 through the communication hole 56. The details of the configuration of the barrel 50 at the screw opposed face 52 side will be described later.

The heater 35 of this embodiment is embedded in the barrel 50. In this embodiment, the barrel 50 is provided with two bar-shaped heaters 35 disposed along the Y direction. The heaters 35 heat a material supplied between the screw 40 and the barrel 50 under the control of the control unit 500.

The ejection section 60 is disposed below the barrel 50. The ejection section 60 includes a nozzle 61 that ejects the shaping material toward the stage 300 and a supply flow channel 62 that causes the communication hole 56 and the nozzle 61 to communicate with each other.

In the nozzle 61, a nozzle flow channel 68 and a nozzle hole 69 are provided. The nozzle flow channel 68 is a flow channel provided in the nozzle 61. The nozzle flow channel 68 communicates with the communication hole 56 of the barrel 50 through the supply flow channel 62. The nozzle hole 69 is a portion in which the cross section of the flow channel provided in an end portion of the nozzle flow channel 68 at a side communicating with the atmosphere is reduced. The shaping material supplied to the nozzle flow channel 68 from the plasticizing section 30 through the supply flow channel 62 is ejected from the nozzle hole 69. In this embodiment, the opening shape of the nozzle hole 69 is a circular shape. The opening shape of the nozzle hole 69 is not limited to a circular shape and may be, for example, a rectangular shape or a polygonal shape other than a rectangular shape.

Figure 2:
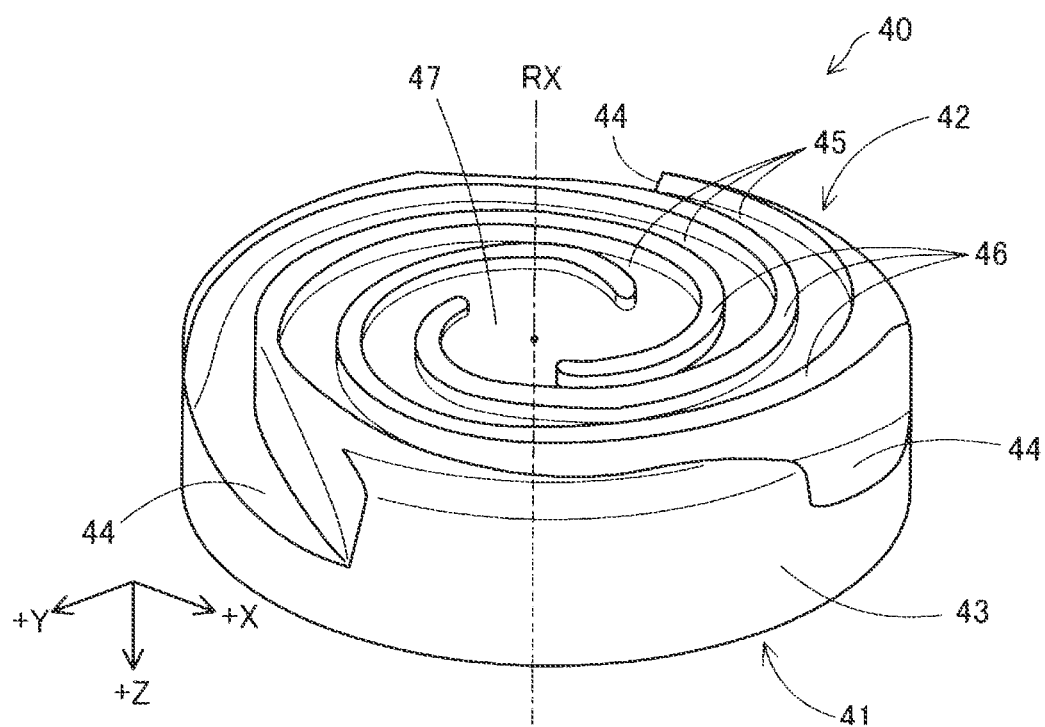
FIG. 2 is a schematic perspective view showing a configuration of a screw at a grooved face side.

FIG. 2 is a schematic perspective view showing a configuration of the screw 40 at the grooved face 42 side. In FIG. 2, the position of the central axis RX of the screw 40 is indicated by a long dashed short dashed line. As described with reference to FIG. 1, in the grooved face 42, the groove 45 is provided.

A central portion 47 of the grooved face 42 of the screw 40 is configured as a recess to which one end of the groove 45 is coupled. The central portion 47 is opposed to the communication hole 56 of the barrel 50 shown in FIG. 1. The central portion 47 crosses the central axis RX.

The groove 45 of the screw 40 constitutes a so-called scroll groove. The groove 45 extends in a spiral shape so as to draw an arc toward the outer circumference of the screw 40 from the central portion 47. The groove 45 may be configured to extend in an involute curve shape or in a helical shape. In the grooved face 42, a projecting ridge portion 46 that constitutes a side wall portion of the groove 45 and that extends along each groove 45 is provided. The groove 45 continues to a material inlet 44 formed in a side face 43 of the screw 40. This material inlet 44 is a portion for receiving the material supplied through the supply channel 22 of the material supply section 20.

In FIG. 2, an example of the screw 40 having three grooves 45 and three projecting ridge portions 46 is shown. The number of grooves 45 or projecting ridge portions 46 provided in the screw 40 is not limited to 3. In the screw 40, only one groove 45 may be provided, or a plurality of two or more grooves 45 may be provided. Further, an arbitrary number of projecting ridge portions 46 may be provided according to the number of grooves 45.

In FIG. 2, an example of the screw 40 in which the material inlet 44 is formed at three sites is shown. The number of sites where the material inlet 44 is provided in the screw 40 is not limited to 3. In the screw 40, the material inlet 44 may be provided at only one site or may be provided at a plurality of two or more sites.

Figure 3:
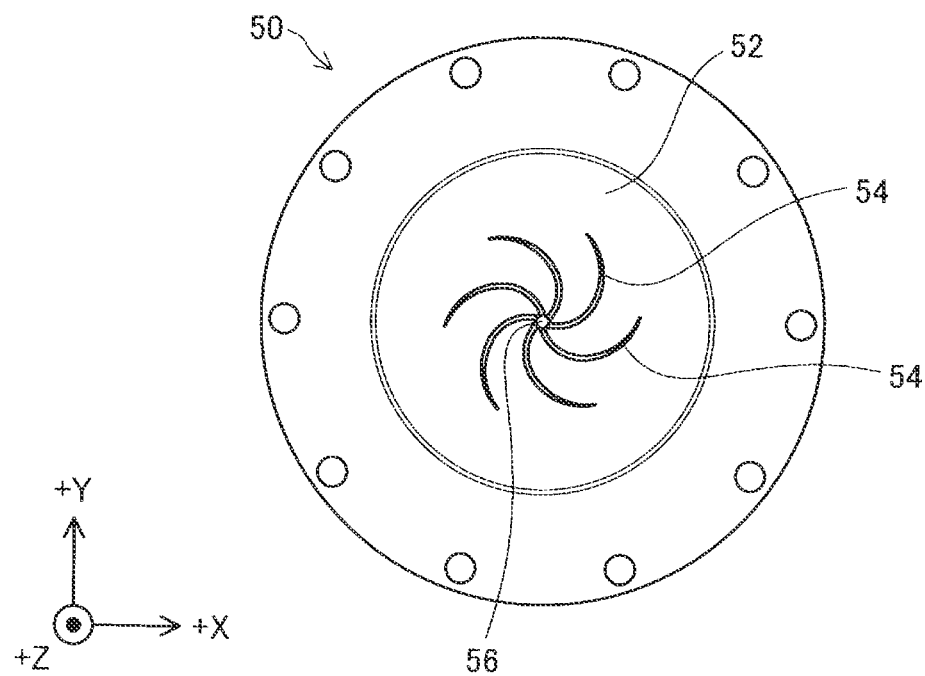
FIG. 3 is a top view showing a configuration of a barrel at a screw opposed face side.

FIG. 3 is a top view showing a configuration of the barrel 50 at the screw opposed face 52 side. As described above, at the center of the screw opposed face 52, the communication hole 56 is formed. Around the communication hole 56 in the screw opposed face 52, a plurality of guide grooves 54 are formed. One end of each of the guide grooves 54 is coupled to the communication hole 56, and each guide groove 54 extends in a spiral shape toward the outer circumference of the screw opposed face 52 from the communication hole 56. Each guide groove 54 has a function of guiding the shaping material to the communication hole 56. It is preferred to form the guide groove 54 in the barrel 50 in order to allow the shaping material to efficiently reach the communication hole 56, but the guide groove 54 need not be formed.

The control unit 500 is constituted by a computer including one or more processors, a main storage device, and an input/output interface for performing signal input/output to/from the outside. The control unit 500 exhibits various functions by execution of a program or a command read on the main storage device by the processor. For example, the control unit 500 not only exhibits a function of executing a three-dimensional shaping process, but also exhibits a function as the below-mentioned state observation section 600, prediction section 700, or instruction acquisition section 750, or the like. The control unit 500 may be constituted not by a computer, but by a combination of a plurality of circuits.

The three-dimensional shaping process refers to a process for shaping a three-dimensional shaped article. The three-dimensional shaping process is sometimes simply referred to as "shaping process". The control unit 500 controls the plasticizing section 30 and the moving mechanism section 400 so as to eject the shaping material to the shaping face 311 from the ejection section 60 in the three-dimensional shaping process. More specifically, the control unit 500 shapes a three-dimensional shaped article by forming layers of the shaping material while solidifying the shaping material ejected onto the shaping face 311. The "solidifying the shaping material" means that the shaping material ejected from the ejection section 60 loses its fluidity. In this embodiment, the shaping material loses its plasticity and is solidified by cooling.

The control unit 500 shapes a three-dimensional shaped article according to shaping data in the three-dimensional shaping process. The shaping data are data including the relative movement path of the ejection section 60 to the stage 300 and the line width of the shaping material in the movement path. The control unit 500 generates shaping data by dividing a three-dimensional shaped article on shape data representing the shape of the three-dimensional shaped article generated using, for example, 3D CAD software or 3D CG software into layers with a predetermined thickness. The control unit 500 can acquire the shape data from, for example, an external computer or the like coupled to the three-dimensional shaping apparatus 100. Further, the control unit 500 may, for example, directly acquire the shaping data from an external computer or the like without generating the shaping data. In addition, the shaping data may be generated using, for example, slicer software or the like.

The line width of the shaping material refers to a width in a direction crossing the movement path of the shaping material ejected onto the shaping face 311. The line width is determined by a deposit amount that is the amount of the shaping material ejected from the ejection section 60 per unit movement amount of the ejection section 60 and the height of the shaping material ejected onto the shaping face 311. The deposit amount is changed by an ejection amount that is the amount of the shaping material ejected per unit time from the ejection section 60 and the moving speed of the ejection section 60. The control unit 500 can keep the height of the shaping material substantially constant by ejecting the shaping material while keeping a gap that is a distance in the Z direction between the ejection section 60 and the shaping face 311 constant.

The state observation section 600 of this embodiment observes the state of the heater 35 provided in the plasticizing section 30. The state observation section 600 of this embodiment makes state observation of the heater 35 based on a heater temperature measured or calculated as the actual temperature of the heater 35 and a heater electric power amount measured or calculated as an electric power consumed by the heater 35. The details of the state observation by the state observation section 600 will be described later.

In this embodiment, the measurement of the heater temperature and the heater electric power amount is performed by a first sensor section 58 including a temperature sensor and a wattmeter. The temperature sensor of the first sensor section 58 may be constituted by, for example, a thermocouple or may be constituted by another contact-type temperature sensor such as a semiconductor temperature sensor or a non-contact-type temperature sensor. In this embodiment, the heater temperature acquired by the temperature sensor of the first sensor section 58 is also used for feedback control of the heater 35 by the control unit 500.

The prediction section 700 of this embodiment predicts a service life arrival time of the heater 35 from the observation result of the heater 35 observed by the state observation section 600. The service life arrival time of the heater 35 refers to a time when the heater arrives at the end of its service life. Note that the service life arrival time of the heater 35 is sometimes referred to as "first service life arrival time". The details of the prediction of the first service life arrival time by the prediction section 700 will be described later.

The instruction acquisition section 750 acquires a shaping start instruction from a user. The shaping start instruction is an instruction for starting the shaping of a three-dimensional shaped article from a user. The shaping start instruction is made by, for example, an input operation for an operation panel provided in the three-dimensional shaping apparatus 100 or a computer coupled to the three-dimensional shaping apparatus 100, or the like. The instruction acquisition section 750 acquires the shaping start instruction made for, for example, an operation panel, a computer, or the like through an electric wiring (not shown). In another embodiment, the instruction acquisition section 750 may include, for example, a receiver that acquires the shaping start instruction through wireless communication. Further, the instruction acquisition section 750 may be configured to acquire an instruction other than the shaping start instruction from a user in addition to the shaping start instruction.

The notification section 800 notifies a user of information. The notification section 800 of this embodiment is constituted by a liquid crystal monitor coupled to the control unit 500 and makes a notification of information by displaying visual information on the liquid crystal monitor. The notification section 800 makes a notification of, for example, the control state of the three-dimensional shaping apparatus 100, the shaping state of a three-dimensional shaped article in the middle of shaping, an elapsed time from the start of shaping, or the like as the information. For example, when the three-dimensional shaping apparatus 100 is placed in a housing, the notification section 800 may be disposed at an outer wall face of the housing as a monitor that can be viewed from the outside of the housing.

Figure 4:
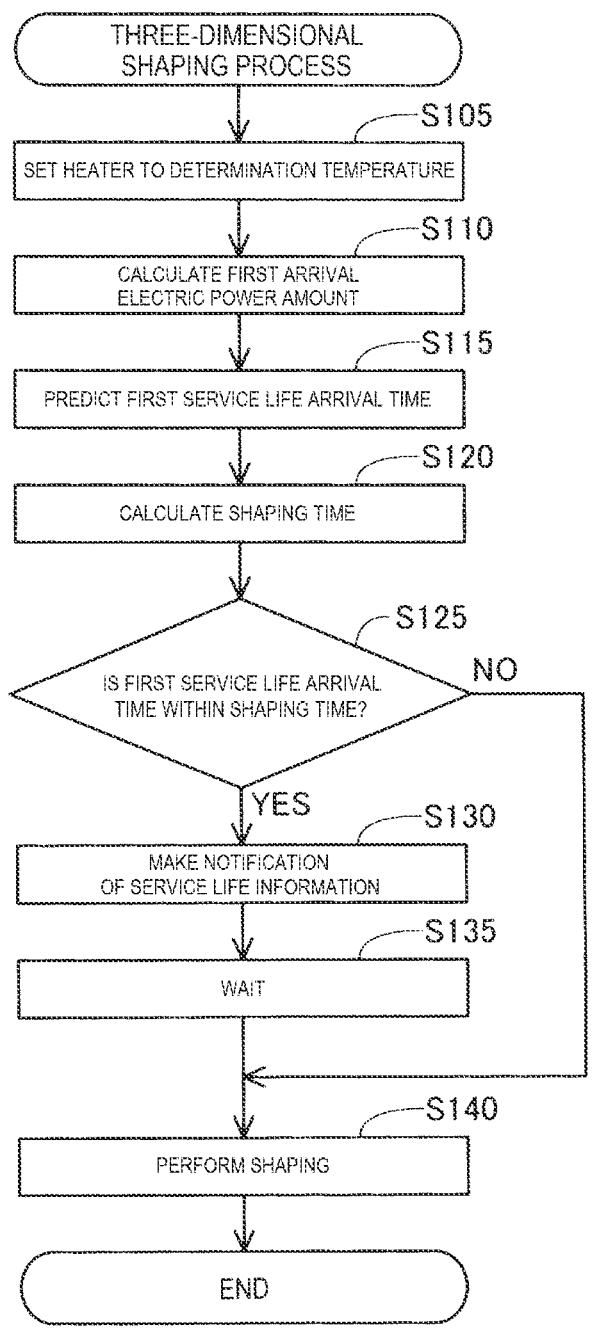
FIG. 4 is a process chart showing a three-dimensional shaping process according to the first embodiment.

FIG. 4 is a process chart showing the three-dimensional shaping process for realizing the three-dimensional shaped article production method in this embodiment. The three-dimensional shaping process is executed by the control unit 500 when a start operation of the three-dimensional shaping process is performed by a user for an operation panel provided in the three-dimensional shaping apparatus 100 or a computer coupled to the three-dimensional shaping apparatus 100. In this embodiment, the control unit 500 acquires the shaping data immediately after the start of the three-dimensional shaping process.

In Step S105, the control unit 500 sets a target temperature of the heater 35 of the plasticizing section 30 to a determination temperature Tj and starts electric power supply to the heater 35. The control unit 500 performs feedback control of the heater 35 so that the heater temperature approaches the determination temperature Tj set as the target temperature with reference to the heater temperature acquired by the first sensor section 58. As the determination temperature Tj, for example, the shaping temperature when controlling the heater 35 in the shaping step of the below-mentioned Step S140 can be used. Specifically, when the heater 35 is controlled to be 250° C. in Step S140, the determination temperature is set to 250° C. Note that as the determination temperature Tj, the shaping temperature of the heater 35 need not be used, and a temperature higher than or lower than the shaping temperature may be used.

In Step S110, the state observation section 600 calculates a first arrival electric power amount. The first arrival electric power amount refers to an electric power amount required for the temperature of the heater 35 to arrive at the determination temperature Tj. The state observation section 600 of this embodiment makes state observation by calculating the first arrival electric power amount. The step of making state observation of the heater 35 as Step S110 is sometimes referred to as "first step".

Figure 5:
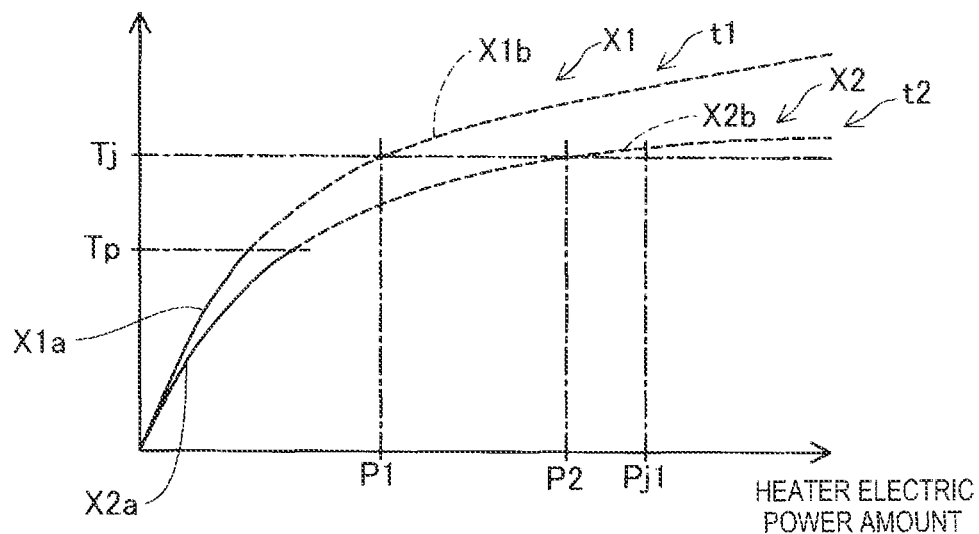
FIG. 5 is a graph in which the horizontal axis represents a heater electric power amount and the vertical axis represents a heater temperature.

FIG. 5 is a graph in which the horizontal axis represents a heater electric power amount and the vertical axis represents a heater temperature. In FIG. 5, a change X1 in the heater electric power amount with respect to the heater temperature at an observation time t1 and a change X2 in the heater electric power amount with respect to the heater temperature at an observation time t2 are shown. The observation time is a time when the state observation is executed, and the observation time t2 is an observation time later than the observation time t1. Specifically, the change X2 at the observation time t2 is measured in the three-dimensional shaping process executed later than the three-dimensional shaping process in which the change X1 at the observation time t1 is measured. As shown in FIG. 5, the first arrival electric power amount at the observation time t1 is an electric power amount P1. On the other hand, the first arrival electric power amount at the observation time t2 is an electric power amount P2 that is larger than the electric power amount P1. Therefore, at the observation time t2, deterioration of the heater 35 is in progress as compared with that at the observation time t1.

The state observation section 600 of this embodiment calculates the first arrival electric power amount to be predicted at a stage before the heater temperature arrives at the determination temperature Tj in Step S110. Specifically, the state observation section 600 measures a change in the heater electric power amount until the heater temperature becomes a temperature Tp that is lower than the determination temperature Tj. Further, the state observation section 600 calculates a change in the heater electric power amount when the heater temperature is increased from the temperature Tp to the determination temperature Tj based on the change in the heater electric power amount until the heater temperature becomes the temperature Tp. For example, at the observation time t1, a change X1b in the heater electric power amount when the heater temperature is increased from the temperature Tp to a temperature exceeding the determination temperature Tj is calculated based on a change X1a in the heater electric power amount until the heater temperature becomes the temperature Tp. That is, the change X1 at the observation time t1 described above is measured by measuring the change X1a and calculating the change X1b. The state observation section 600, for example, approximates the change X1a in the heater electric power amount by an appropriate function and can calculate the change X1b in the heater electric power amount based on the approximated function. Further, in the same manner as in the case at the observation time t1, at the observation time t2, a change X2b in the heater electric power amount when the heater temperature is increased from the temperature Tp to a temperature exceeding the determination temperature Tj is calculated based on a change X2a in the heater electric power amount until the heater temperature becomes the temperature Tp. That is, the change X2 at the observation time t2 described above is measured by measuring the change X2a and calculating the change X2b.

In Step S115, the prediction section 700 predicts the first service life arrival time when the heater 35 arrives at the end of its service life. The prediction section 700 of this embodiment predicts the first service life arrival time by predicting a time when the first arrival electric power amount exceeds a first determination value Pj1 shown in FIG. 5. In this embodiment, the first service life arrival time is predicted using the below-mentioned increase history of the first arrival electric power amount. Note that the step of predicting the service life arrival time as Step S115 is sometimes referred to as "second step".

Figure 6:
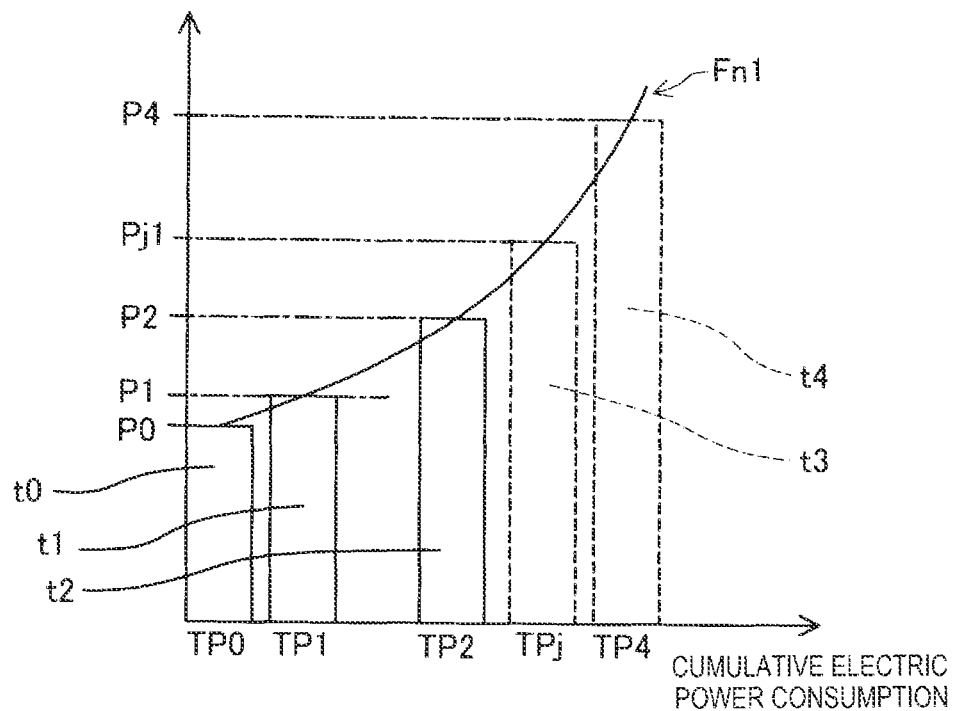
FIG. 6 is a graph showing an increase history of a first arrival electric power amount.

FIG. 6 is a graph showing an increase history of the first arrival electric power amount. In FIG. 6, a change in the first arrival electric power amount with respect to an increase in the cumulative electric power consumption of the heater 35 is shown. In FIG. 6, a manner in which a cumulative electric power consumption TP1 and a first arrival electric power amount P1 of the heater 35 at the observation time t1 are recorded as a history is shown. Further, a manner in which a cumulative electric power consumption TP2 and a first arrival electric power amount P2 at the observation time t2 are recorded as a history is shown. The prediction section 700, for example, predicts an increase in the first arrival electric power amount after the observation time t2 using the increase history before the observation time t2 when the state of the heater 35 at the observation time t2 is observed in Step S110. The prediction section 700, for example, approximates the increase history before the observation time t2 by a function Fn1, and predicts an increase in the first arrival electric power amount with respect to an increase in the cumulative electric power consumption after the observation time t2 based on the function Fn1. The prediction section 700 calculates a cumulative electric power consumption TPj of the heater 35 when the first arrival electric power amount becomes the first determination value Pj1 by predicting an increase in the first arrival electric power amount after the observation time t2 in this manner. In FIG. 6, a first arrival electric power amount P0 and a cumulative electric power consumption TP0 when the heater 35 is first operated are recorded as an increase history at an observation time t0. In that case, a relationship between the first arrival electric power amount P0 and the cumulative electric power consumption TP0 at the observation time t0 may be derived from, for example, a theoretical value of the temperature change with respect to the electric power consumption of the heater 35.

Further, the prediction section 700 predicts the first service life arrival time from a difference between the calculated cumulative electric power consumption TPj and the cumulative electric power consumption TP2 at the observation time t2. In this embodiment, the prediction section 700 calculates a residual time until the heater 35 arrives at the end of its service life by dividing the difference between the cumulative electric power consumption TP2 and the cumulative electric power consumption TPj (TP2−TPj) by the electric power consumption when the heater 35 is operated at the shaping temperature. In the increase history shown in FIG. 6, it is shown that the first arrival electric power amount becomes the determination value Pj at a time t3. Further, for example, when the first arrival electric power amount observed in Step S110 exceeds the first determination value Pj1, in Step S115, a first arrival electric power amount P4 exceeding the first determination value Pj1 is recorded as the increase history at a time t4 shown in FIG. 6. The cumulative electric power consumption at the time t4 is TP4 that is larger than TPj, and the residual time of the heater 35 at that time is calculated to be 0. In that case, the first service life arrival time coincides with the start time of the shaping step of the below-mentioned Step S140.

In Step S120, the control unit 500 calculates a shaping time. The shaping time is a shaping time required for shaping a three-dimensional shaped article calculated based on the shaping data and control values when the plasticizing section 30 and the moving mechanism section 400 are controlled. In this embodiment, as described above, the shaping data are acquired immediately after the start of the three-dimensional shaping process, however, in another embodiment, the shaping data may be acquired at another timing until Step S120 is executed.

In Step S125, the control unit 500 makes service life determination to determine whether or not the first service life arrival time is within the shaping time. Specifically, in this embodiment, the control unit 500 compares the residual time of the heater 35 with the shaping time and determines that the first service life arrival time is within the shaping time when the residual time of the heater 35 is equal to or less than the shaping time. Note that the step of determining whether or not the service life arrival time is within the shaping time as Step S125 is sometimes referred to as "third step".

When it is determined that the first service life arrival time is within the shaping time in Step S125, in Step S130, the control unit 500 controls the notification section 800 to notify a user of service life information. The service life information is information representing a result of the service life determination. In this embodiment, specifically, in Step S130, a user is notified of information indicating that the first service life arrival time is equal to or less than the shaping time. As shown in FIG. 4, Step S130 is executed before the shaping step of the below-mentioned Step S140. According to this, for example, a user can replace the deteriorated heater 35 with another heater 35 that is not deteriorated before shaping a three-dimensional shaped article. In Step S130, the control unit 500 may, for example, advise a user to replace the deteriorated heater 35. Note that the step of making a notification of the service life information as Step S130 is sometimes referred to as "fourth step".

In Step S135, the control unit 500 makes the three-dimensional shaping apparatus 100 wait until a shaping start instruction is acquired by the instruction acquisition section 750. When the shaping start instruction is acquired by the instruction acquisition section 750, the control unit 500 makes the process proceed to Step S140 from Step S135. That is, when the first service life arrival time is within the shaping time, the control unit 500 of this embodiment makes a notification of the service life information via the notification section 800, acquires a shaping start instruction via the instruction acquisition section 750, and then, shapes a three-dimensional shaped article. Therefore, a user can, for example, make a shaping start instruction after replacing the deteriorated heater 35 with another heater 35 that is not deteriorated, and can shape a three-dimensional shaped article after completion of replacement of the heater 35.

In Step S140, the control unit 500 performs shaping of a three-dimensional shaped article. Step S140 is also executed when it is determined that the first service life arrival time is not within the shaping time in Step S125. In that case, in this embodiment, shaping of a three-dimensional shaped article is performed in Step S140 without executing notification of the service life information of Step S130 and waiting of Step S135. Note that the step of shaping a three-dimensional shaped article as Step S140 is sometimes referred to as "fifth step". Further, in another embodiment, when it is determined that the service life arrival time is not within the shaping time, the control unit 500 may, for example, make a notification of the service life information indicating that the service life arrival time is not within the shaping time. In that case, the control unit 500 may shape a three-dimensional shaped article while making a notification of the service life information indicating that the first service life arrival time is not within the shaping time.

According to the three-dimensional shaping apparatus 100 described above, when the first service life arrival time is within the shaping time, the control unit 500 controls the notification section 800 to make a notification of the service life information. According to this, a user can, for example, replace the deteriorated heater 35 with another heater 35 that is not deteriorated before shaping a three-dimensional shaped article based on the service life information notified by the notification section 800. Therefore, even when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed.

Further, in this embodiment, the state observation section 600 observes the first arrival electric power amount of the heater 35 as the state of the heater 35, and the prediction section 700 predicts the first service life arrival time by predicting a time when the first arrival electric power amount exceeds the first determination value Pj1. Therefore, the state of the heater 35 can be easily observed when the temperature of the heater 35 is increased, and the service life arrival time of the heater 35 can be efficiently observed.

Further, in this embodiment, when the service life arrival time of the heater 35 is within the shaping time, the control unit 500 makes a notification of the service life information via the notification section 800, acquires a shaping start instruction via the instruction acquisition section 750, and then, shapes a three-dimensional shaped article. According to this, a user can, for example, make a shaping start instruction after replacing the deteriorated heater 35 with another heater 35, and can start shaping a three-dimensional shaped article. Therefore, even when deterioration of the heater 35 is in progress, a possibility that replacement of the heater 35 is needed in the middle of shaping of a three-dimensional shaped article is further decreased, and deterioration of shaping quality due to suspension or resumption of shaping accompanying the replacement of the heater 35 is suppressed.

Further, in this embodiment, the screw 40 rotates around the rotational axis and has the grooved face 42, and the plasticizing section 30 includes the barrel 50 opposed to the grooved face 42. According to this, the plasticizing section 30 can be miniaturized, and therefore, the three-dimensional shaping apparatus 100 can be miniaturized.

Here, the material of the three-dimensional shaped article to be used in the above-mentioned three-dimensional shaping apparatus 100 will be described. In the three-dimensional shaping apparatus 100, for example, a three-dimensional shaped article can be shaped using any of various materials such as a material having thermoplasticity, a metal material, and a ceramic material as a main material. Here, the "main material" means a material serving as a main component for forming the shape of the three-dimensional shaped article and refers to a material whose content ratio is 50 wt % or more in the three-dimensional shaped article. In the above-mentioned shaping material, a material obtained by melting such a main material singly, and a material formed into a paste by melting some components contained together with the main material are included.

When a material having thermoplasticity is used as the main material, the shaping material is formed by plasticization of the material in the plasticizing section 30.

As the material having thermoplasticity, for example, the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive such as a wax, a flame retardant, an antioxidant, or a heat stabilizer, or the like may be mixed. The material having thermoplasticity is plasticized and converted into a molten state by the rotation of the screw 40 and heating by the heater 35 in the plasticizing section 30.

The material having thermoplasticity is desirably injected from the ejection section 60 in a completely molten state by being heated to a temperature equal to or higher than the glass transition point thereof. For example, when an ABS resin is used, the temperature thereof when it is ejected from the ejection section 60 is desirably about 200° C.

In the three-dimensional shaping apparatus 100, in place of the above-mentioned material having thermoplasticity, for example, the following metal material may be used as the main material. In that case, it is desirable that a component that melts when forming the shaping material is mixed in a powder material obtained by pulverizing the following metal material into a powder, and the resulting material is fed to the plasticizing section 30 as a material MR.

Examples of Metal Material single metals of magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, stainless steel, cobalt-chromium-molybdenum, a titanium alloy, a nickel alloy, an aluminum alloy, a cobalt alloy, and a cobalt-chromium alloy In the three-dimensional shaping apparatus 100, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material ejected onto the stage 300 may be cured by sintering.

The powder material of the metal material or the ceramic material to be fed to the material supply section 20 as the material MR may be a mixed material obtained by mixing multiple types of single metal powders or alloy powders or ceramic material powders. Further, the powder material of the metal material or the ceramic material may be coated with, for example, a thermoplastic resin as exemplified above or any other thermoplastic resin. In that case, the material may be configured to exhibit fluidity by melting the thermoplastic resin in the plasticizing section 30.

To the powder material of the metal material or the ceramic material to be fed to the material supply section 20 as the material MR, for example, a solvent as described below can also be added. As the solvent, one type or a combination of two or more types selected from the following solvents can be used.

Examples of Solvent water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; tetra-alkyl ammonium acetates (for example, tetra-butyl ammonium acetate, etc.); ionic liquids such as butyl carbitol acetate, and the like In addition thereto, for example, a binder as described below can also be added to the powder material of the metal material or the ceramic material to be fed to the material supply section 20 as the material MR.

Figure 7:
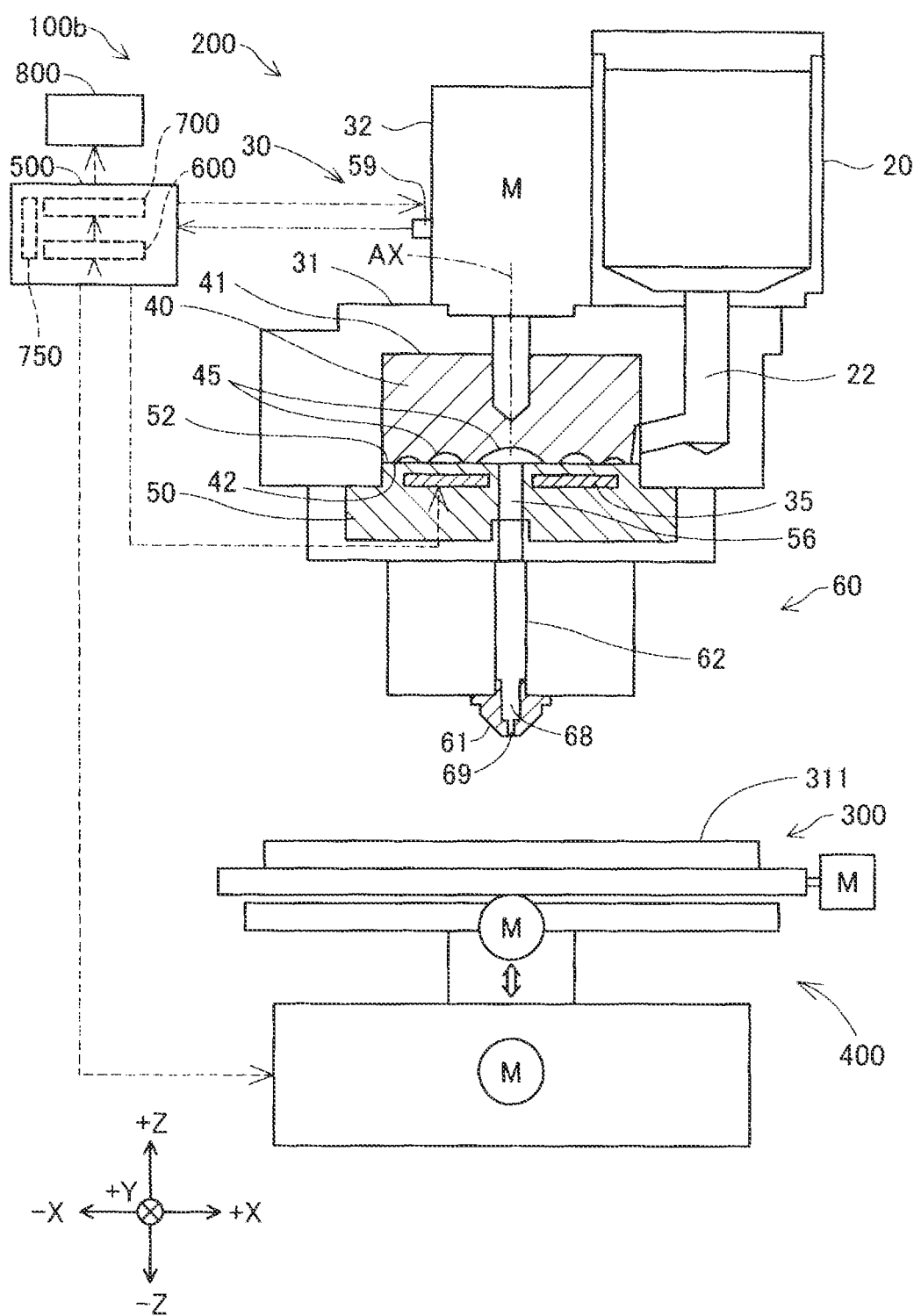
FIG. 7 is a view showing a schematic configuration of a three-dimensional shaping apparatus according to a second embodiment.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or other thermoplastic resins B. Second Embodiment FIG. 7 is a view showing a schematic configuration of a three-dimensional shaping apparatus 100b according to a second embodiment. The three-dimensional shaping apparatus 100b does not include the first sensor section 58, but includes a second sensor section 59 unlike in the first embodiment. Further, in the three-dimensional shaping apparatus 100b, the state observation section 600 observes the state of the drive motor 32, and the prediction section 700 predicts the service life arrival time of the drive motor 32 from the observation result of the state observation section 600. Points that are not particularly described with respect to the three-dimensional shaping apparatus 100b are the same as those of the first embodiment.

As described above, the state observation section 600 of this embodiment observes the state of the drive motor 32 provided in the plasticizing section 30. The state observation section 600 of this embodiment makes state observation of the drive motor 32 based on a motor rotational speed measured or calculated as the actual motor rotational speed of the drive motor 32 and a motor electric power amount measured or calculated as an electric power consumed by the drive motor 32. The details of the state observation of the drive motor 32 by the state observation section 600 will be described later.

In this embodiment, the measurement of the motor rotational speed and the motor electric power amount is performed by the second sensor section 59 including a tachometer and a wattmeter. The tachometer of the second sensor section 59 includes a light emitting portion and a light receiving portion (both not shown). The tachometer of the second sensor section 59 irradiates a reflection mark (not shown) provided at a face at a rotational axis side of the drive motor 32 with a laser, and receives the laser reflected from the reflection mark. The second sensor section 59 measures the motor rotational speed by measuring an interval of the light receiving timing of the laser reflected from the reflection mark. The tachometer of the second sensor section 59 may be constituted by another non-contact-type tachometer, or may be constituted by a contact-type tachometer. In this embodiment, the motor rotational speed acquired by the tachometer of the second sensor section 59 is also used for feedback control of the drive motor 32 by the control unit 500.

The prediction section 700 of this embodiment predicts a service life arrival time of the drive motor 32 from the observation result of the drive motor 32 observed by the state observation section 600. The service life arrival time of the drive motor 32 refers to a time when the drive motor 32 arrives at the end of its service life. Note that the service life arrival time of the drive motor 32 is sometimes referred to as "second service life arrival time". The details of the prediction of the second service life arrival time by the prediction section 700 will be described later.

Figure 8:
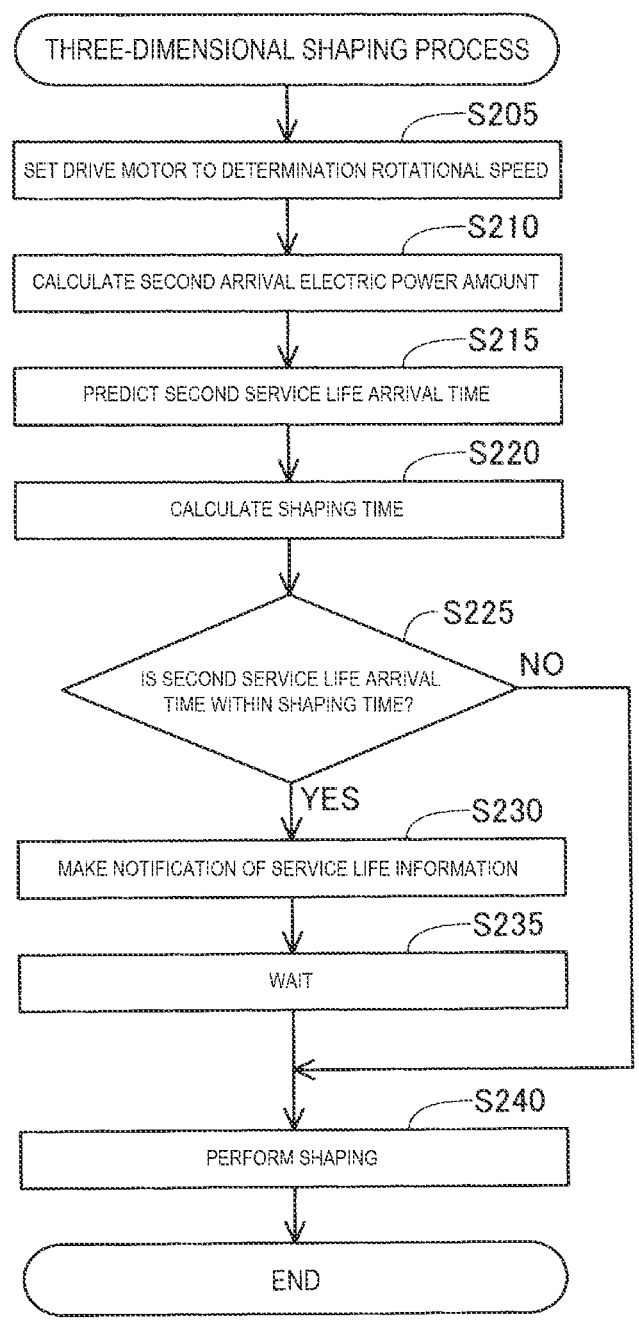
FIG. 8 is a process chart showing a shaping process fora three-dimensional shaped article according to the second embodiment.

FIG. 8 is a process chart showing a shaping process for a three-dimensional shaped article in the second embodiment.

In Step S205, the control unit 500 sets a target rotational speed of the drive motor 32 to a determination rotational speed Rj and starts driving the drive motor 32. The control unit 500 performs feedback control of the drive motor 32 so that the motor rotational speed approaches the determination rotational speed Rj set as the target rotational speed with reference to the motor rotational speed acquired by the second sensor section 59. By executing Step S205, the determination rotational speed Rj is determined, for example, as a value for determining the state of the drive motor 32. The determination rotational speed Rj may, for example, correspond to the rotational speed of the drive motor 32 controlled in the shaping step of Step S240. In that case, the determination rotational speed Rj may be determined, for example, as an average of the rotational speed of the drive motor 32 in Step S240.

In Step S210, the state observation section 600 calculates a second arrival electric power amount. The second arrival electric power amount refers to an electric power amount required for the rotational speed of the drive motor 32 to arrive at the determination rotational speed Rj. The state observation section 600 of this embodiment makes state observation by calculating the second arrival electric power amount. The step of making state observation of the drive motor 32 as Step S210 is sometimes referred to as "first step" in the same manner as Step S110 in the first embodiment shown in FIG. 4. That is, in the first step, the state observation of the drive motor 32 or the heater 35 is made.

Figure 9:
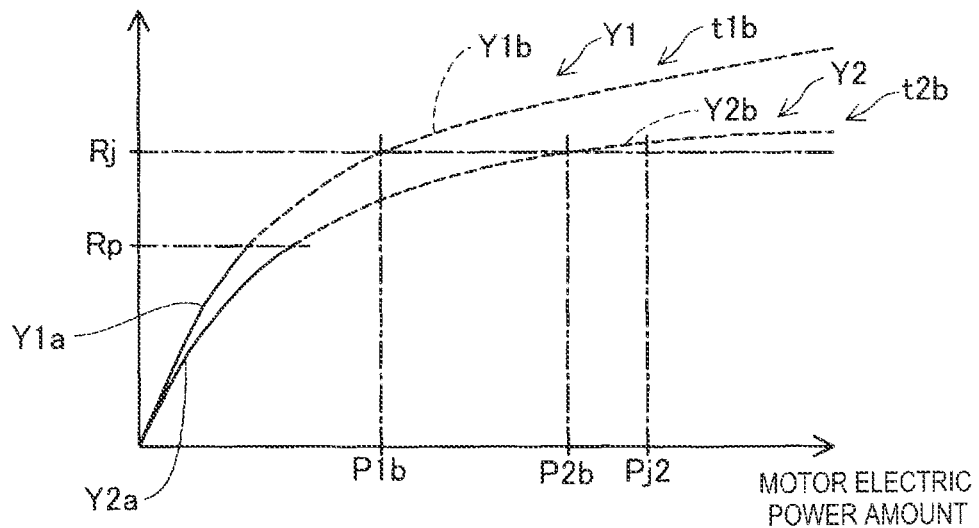
FIG. 9 is a graph in which the horizontal axis represents a motor electric power amount and the vertical axis represents a motor rotational speed.

FIG. 9 is a graph in which the horizontal axis represents a motor electric power amount and the vertical axis represents a motor rotational speed. In FIG. 9, a change Y1 in the motor electric power amount with respect to the motor rotational speed at an observation time t1b and a change Y2 in the motor electric power amount with respect to the motor rotational speed at an observation time t2b are shown. The observation time is a time when the state observation is executed, and the observation time t2b is an observation time later than the observation time t1b. Specifically, the change Y2 at the observation time t2b is measured in the three-dimensional shaping process executed later than the three-dimensional shaping process in which the change Y1 at the observation time t1b is measured. As shown in FIG. 9, the second arrival electric power amount at the observation time t1b is an electric power amount P1b. On the other hand, the first arrival electric power amount at the observation time t2b is an electric power amount P2b that is larger than the electric power amount P1b. Therefore, at the observation time t2b, deterioration of the drive motor 32 is in progress as compared with that at the observation time t1b.

The state observation section 600 of this embodiment calculates the second arrival electric power amount to be predicted at a stage before the motor rotational speed arrives at the determination rotational speed Rj in Step S210. Specifically, the state observation section 600 measures a change in the motor electric power amount until the motor rotational speed becomes a rotational speed Rp that is lower than the determination rotational speed Rj. Further, the state observation section 600 calculates a change in the motor electric power amount when the motor rotational speed is increased from the rotational speed Rp to the determination rotational speed Rj based on the change in the motor electric power amount until the motor rotational speed becomes the rotational speed Rp. For example, at the observation time t1b, a change Y1b in the motor electric power amount when the motor rotational speed is increased from the rotational speed Rp to a rotational speed exceeding the determination rotational speed Rj is calculated based on a change Y1a in the motor electric power amount until the motor rotational speed becomes the rotational speed Rp. That is, the change Y1 at the observation time t1b described above is measured by measuring the change Y1a and calculating the change Y1b. The state observation section 600, for example, approximates the change Y1a in the motor electric power amount by an appropriate function and can calculate the change Y1b in the motor electric power amount based on the approximated function. Further, in the same manner as in the case at the observation time t1b, at the observation time t2b, a change Y2b in the motor electric power amount when the motor rotational speed is increased from the rotational speed Rp to a rotational speed exceeding the determination rotational speed Rj is calculated based on a change Y2a in the motor electric power amount until the motor rotational speed becomes the rotational speed Rp. That is, the change Y2 at the observation time t2b described above is measured by measuring the change Y2a and calculating the change Y2b.

In Step S215, the prediction section 700 predicts the second service life arrival time when the drive motor 32 arrives at the end of its service life. The prediction section 700 of this embodiment predicts the second service life arrival time by predicting a time when the second arrival electric power amount exceeds a second determination value Pj2 shown in FIG. 9. Specifically, the second service life arrival time is predicted using the below-mentioned increase history of the second arrival electric power amount. Note that the step of predicting the service life arrival time as Step S215 is sometimes referred to as "second step" in the same manner as Step S115 in the first embodiment shown in FIG. 4.

Figure 10:
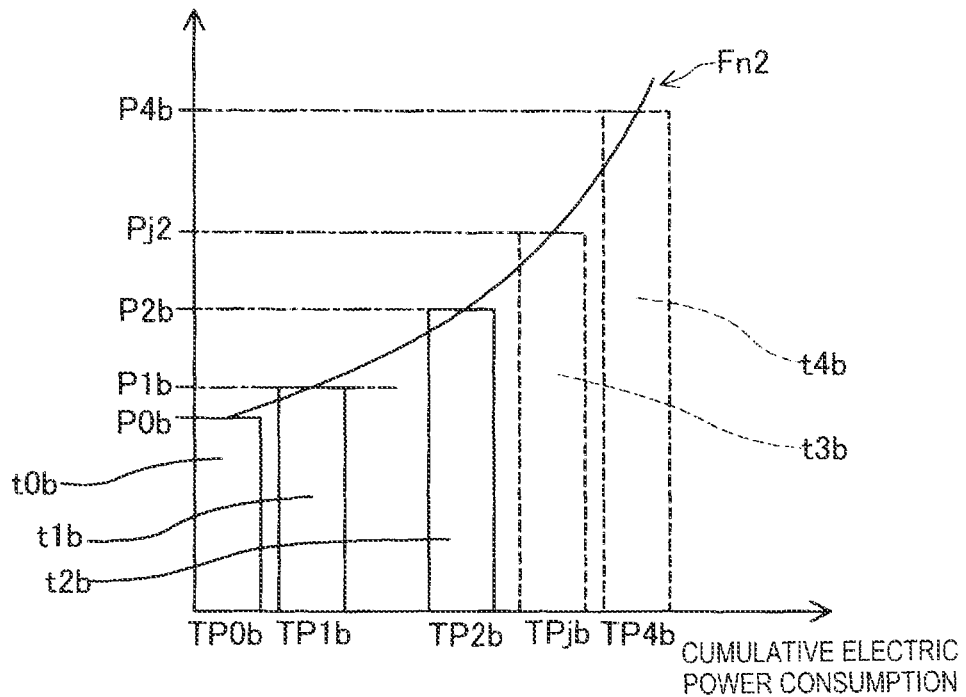
FIG. 10 is a graph showing an increase history of a second arrival electric power amount.

FIG. 10 is a graph showing an increase history of the second arrival electric power amount. In FIG. 10, a change in the second arrival electric power amount with respect to an increase in the cumulative electric power consumption of the drive motor 32 is shown. In FIG. 10, a manner in which a cumulative electric power consumption TP1b of the drive motor 32 at the observation time t1b and a second arrival electric power amount P1b are recorded as a history is shown. Further, a manner in which a cumulative electric power consumption TP2b at the observation time t2b and a second arrival electric power amount P2b are recorded as a history is shown. The prediction section 700, for example, predicts an increase in the second arrival electric power amount after the observation time t2b using the increase history before the observation time t2b when the state of the drive motor 32 at the observation time t2b is observed in Step S210. The prediction section 700, for example, approximates the increase history before the observation time t2b by a function Fn2, and predicts an increase in the second arrival electric power amount with respect to an increase in the cumulative electric power consumption after the observation time t2b based on the function Fn2. The prediction section 700 calculates a cumulative electric power consumption TPjb of the drive motor 32 when the second arrival electric power amount becomes a second determination value Pj2 by predicting an increase in the second arrival electric power amount after the observation time t2b in this manner. In FIG. 10, a second arrival electric power amount P0b and a cumulative electric power consumption TP0b when the drive motor 32 is first driven are recorded as an increase history at an observation time t0b. In that case, a relationship between the second arrival electric power amount P0b and the cumulative electric power consumption TP0b at the observation time t0b may be derived from, for example, a theoretical value of the change in the rotational speed with respect to the electric power consumption of the drive motor 32.

Further, the prediction section 700 predicts the second service life arrival time from a difference between the calculated cumulative electric power consumption TPjb and the cumulative electric power consumption TP2b at the observation time t2b. In this embodiment, the prediction section 700 calculates a residual time until the drive motor 32 arrives at the end of its service life by dividing the difference between the cumulative electric power consumption TP2b and the cumulative electric power consumption TPjb (TP2b−TPjb) by the electric power consumption when the drive motor 32 is driven at the average rotational speed in the shaping step. In the increase history shown in FIG. 10, it is shown that the second arrival electric power amount becomes the second determination value Pj2 at a time t3b. Further, for example, when the second arrival electric power amount observed in Step S210 exceeds the second determination value Pj2, in Step S215, a second arrival electric power amount P4b exceeding the second determination value Pj2 is recorded as the increase history at a time t4b shown in FIG. 10. The cumulative electric power consumption at the time t4b is TP4b that is larger than TPjb, and the residual time of the drive motor 32 at that time is calculated to be 0. In that case, the second service life arrival time coincides with the start time of the shaping step of the below-mentioned Step S240.

Step S220 is the same as Step S120 shown in FIG. 4, and therefore, the description thereof will be omitted.

In Step S225, the control unit 500 makes service life determination to determine whether or not the second service life arrival time is within the shaping time. Specifically, in this embodiment, the control unit 500 compares the residual time of the drive motor 32 with the shaping time and determines that the second service life arrival time is within the shaping time when the residual time of the drive motor 32 is equal to or less than the shaping time. Note that the step of determining whether or not the service life arrival time is within the shaping time as Step S225 is sometimes referred to as "third step" in the same manner as Step S125 in the first embodiment shown in FIG. 4.

When it is determined that the second service life arrival time is within the shaping time in Step S225, in Step S230, the control unit 500 controls the notification section 800 to notify a user of the service life information. In this embodiment, specifically, in Step S230, a user is notified of information indicating that the second service life arrival time is within the shaping time. As shown in FIG. 8, Step S230 is executed before the shaping step of the below-mentioned Step S240. According to this, for example, the user can replace the deteriorated drive motor 32 with another drive motor 32 that is not deteriorated before shaping a three-dimensional shaped article. In Step S230, the control unit 500 may, for example, advise a user to replace the deteriorated drive motor 32. Note that the step of making a notification of the service life information as Step S230 is sometimes referred to as "fourth step" in the same manner as Step S130 in the first embodiment shown in FIG. 4.

In Step S235, the control unit 500 makes the three-dimensional shaping apparatus 100 wait until a shaping start instruction is acquired by the instruction acquisition section 750. When the shaping start instruction is acquired by the instruction acquisition section 750, the control unit 500 makes the process proceed to Step S240 from Step S235. In Step S240, the control unit 500 performs shaping of a three-dimensional shaped article. That is, when the second service life arrival time is within the shaping time, the control unit 500 of this embodiment makes a notification of the service life information via the notification section 800, thereafter acquires a shaping start instruction via the instruction acquisition section 750, and then, shapes a three-dimensional shaped article. A user can, for example, make a shaping start instruction after replacing the deteriorated drive motor 32 with another drive motor 32 that is not deteriorated, and can shape a three-dimensional shaped article after completion of replacement of the drive motor 32. Step S240 is also executed when it is determined that the second service life arrival time is not within the shaping time in Step S225.

According to the three-dimensional shaping apparatus 100b of the second embodiment described above, when the second service life arrival time is within the shaping time, the control unit 500 controls the notification section 800 to make a notification of the service life information. According to this, a user can, for example, replace the deteriorated drive motor 32 with another drive motor 32 that is not deteriorated before shaping a three-dimensional shaped article based on the service life information notified by the notification section 800. Therefore, even when deterioration of the drive motor 32 is in progress, a possibility that replacement of the drive motor 32 is needed in the middle of shaping of a three-dimensional shaped article is decreased, and deterioration of shaping quality due to suspension or resumption of shaping accompanying the replacement of the drive motor 32 is suppressed.

Further, in this embodiment, the state observation section 600 observes the second arrival electric power amount of the drive motor 32 as the state of the drive motor 32, and the prediction section 700 predicts the second service life arrival time by predicting a time when the second arrival electric power amount exceeds the second determination value Pj2. Therefore, the state of the drive motor 32 can be easily observed when increasing the rotational speed of the drive motor 32, and the service life arrival time of the drive motor 32 can be efficiently observed.

In another embodiment, the state observation section 600 may observe both the state of the drive motor 32 and the state of the heater 35, or may observe only either one state as in the first embodiment or the second embodiment. Further, the prediction section 700 may predict both the service life arrival time of the drive motor 32 and the service life arrival time of the heater 35, or may predict either one service life arrival time as in the first embodiment or the second embodiment.

C. Third Embodiment

Figure 11:
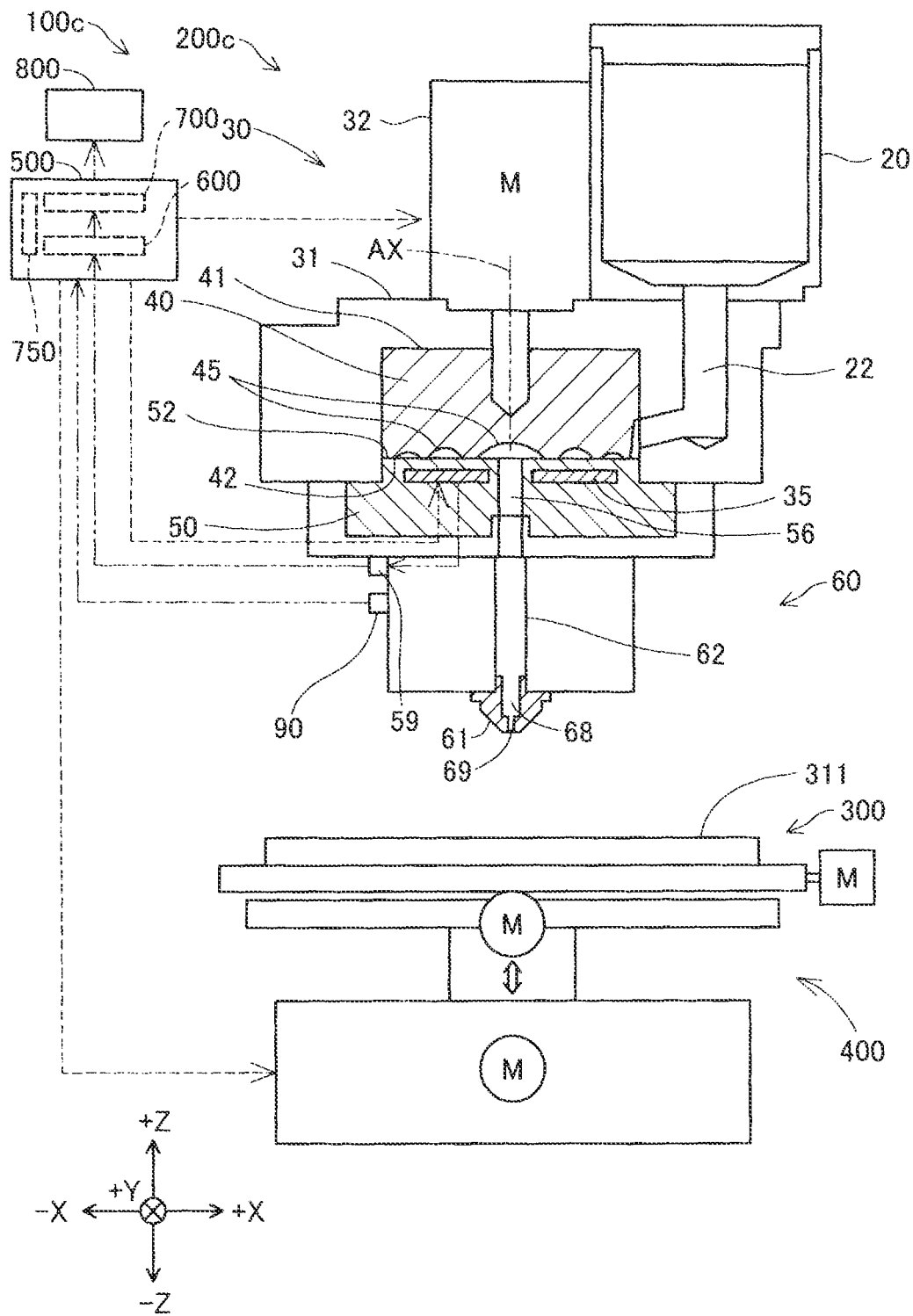
FIG. 11 is a view showing a schematic configuration of a three-dimensional shaping apparatus according to a third embodiment.

FIG. 11 is a view showing a schematic configuration of a three-dimensional shaping apparatus 100c according to a third embodiment. The three-dimensional shaping apparatus 100c includes a temperature acquisition section 90 unlike in the first embodiment. Points that are not particularly described with respect to the three-dimensional shaping apparatus 100c are the same as those of the first embodiment.

The temperature acquisition section 90 acquires an ambient temperature that is a temperature outside the plasticizing section 30. In this embodiment, the temperature acquisition section 90 includes a temperature sensor and acquires a temperature in a room where the three-dimensional shaping apparatus 100c is placed as the ambient temperature. The temperature sensor of the temperature acquisition section 90 may be constituted by, for example, a thermocouple, or may be constituted by another contact-type temperature sensor such as a semiconductor temperature sensor or a non-contact-type temperature sensor. In another embodiment, for example, when the plasticizing section 30 is housed in a housing such as a chamber, the temperature acquisition section 90 may measure the temperature of a space outside the plasticizing section 30 in the housing.

In this embodiment, the control unit 500 executes the same three-dimensional shaping process as the process shown in FIG. 4. The control unit 500 of this embodiment changes the first determination value Pj1 in Step S115 according to the ambient temperature acquired by the temperature acquisition section 90. Specifically, when the ambient temperature is a second ambient temperature higher than a first ambient temperature, the control unit 500 determines the first determination value Pj1 at the second ambient temperature as a higher value than the first determination value Pj1 at the first ambient temperature.

The degree of change in the heater electric power amount with respect to the change in the heater temperature as shown in FIG. 5 changes according to the ambient temperature of the heater 35. For example, when the ambient temperature is the second ambient temperature, as compared with a case where the ambient temperature is the first ambient temperature, the heater electric power amount required for realizing the same heater temperature decreases. Therefore, when the ambient temperature is the second ambient temperature, as compared with a case where the ambient temperature is the first ambient temperature, there is a possibility that the service life arrival time of the heater 35 is predicted to be apparently later. In this embodiment, the first determination value Pj1 is determined according to the ambient temperature as described above, and therefore, the effect of the ambient temperature is added to the prediction of the first service life arrival time. Note that the first determination value Pj1 at each ambient temperature is predetermined, for example, based on a result of an experiment that examines a change in the arrival electric power amount with respect to a change in the ambient temperature.

According also to the three-dimensional shaping apparatus 100c of the third embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, when the ambient temperature is the second ambient temperature higher than the first ambient temperature, the control unit 500 determines the determination value to be the second determination value lower than the first determination value. According to this, the effect of the ambient temperature is added to the prediction of the service life arrival time of the heater 35 by the prediction section 700, and the service life arrival time of the heater 35 is more appropriately predicted. Therefore, a possibility that replacement of the heater 35 is needed in the middle of shaping of a three-dimensional shaped article is further decreased, and deterioration of shaping quality due to suspension or resumption of shaping accompanying the replacement of the heater 35 is further suppressed.

In another embodiment, the control unit 500 may change the second determination value Pj2 according to the ambient temperature. In that case, the control unit 500, for example, executes the same three-dimensional shaping process as the process shown in FIG. 8, and changes the second determination value Pj2 in Step S215 according to the ambient temperature acquired by the temperature acquisition section 90. The degree of change in the motor electric power amount with respect to the change in the motor rotational speed as shown in FIG. 8 changes according to the ambient temperature of the drive motor 32. Therefore, there is a possibility that the service life arrival time of the drive motor 32 is predicted to be apparently earlier or later depending on the ambient temperature. By determining the second determination value Pj2 according to the ambient temperature as described above, the effect of the ambient temperature is added to the prediction of the second service life arrival time, and the service life arrival time of the drive motor 32 is more appropriately predicted. Therefore, a possibility that replacement of the drive motor 32 is needed in the middle of shaping of a three-dimensional shaped article is further decreased, and deterioration of shaping quality due to suspension or resumption of shaping accompanying the replacement of the drive motor 32 is further suppressed. Note that the second determination value Pj2 at each ambient temperature is predetermined, for example, based on a result of an experiment that examines a change in the arrival electric power amount with respect to a change in the ambient temperature.

Further, when the state observation section 600 observes both the state of the drive motor 32 and the state of the heater 35, and the prediction section 700 predicts both the service life arrival time of the drive motor 32 and the service life arrival time of the heater 35, the control unit 500 may determine both the first determination value Pj1 and the second determination value Pj2 according to the ambient temperature.

D. Fourth Embodiment

Figure 12:
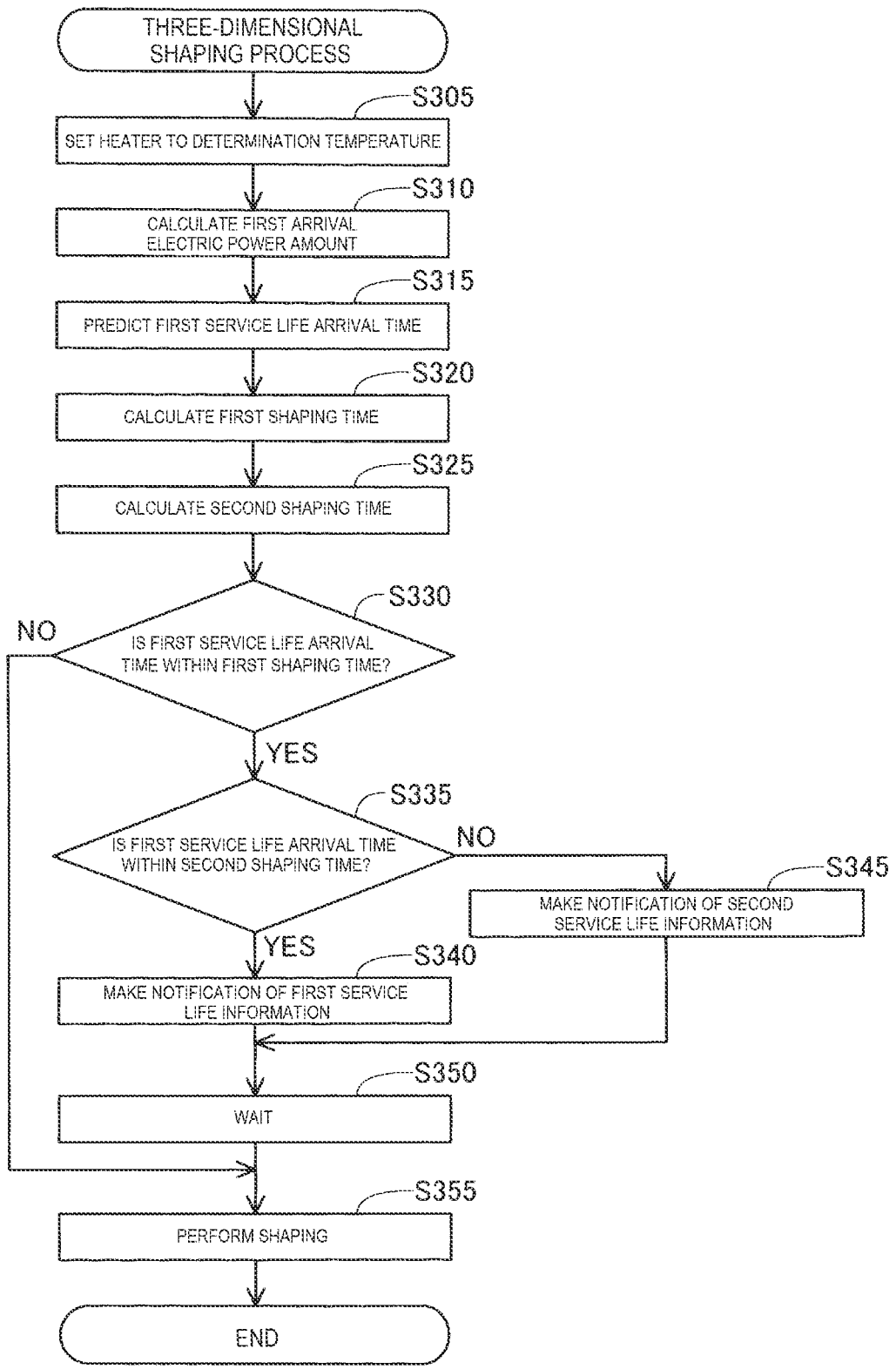
FIG. 12 is a process chart showing a shaping process for a three-dimensional shaped article according to a fourth embodiment.

FIG. 12 is a process chart showing a shaping process for a three-dimensional shaped article in a fourth embodiment. In the fourth embodiment, the control unit 500 acquires first shaping data and second shaping data as the shaping data. Further, the control unit 500 determines whether or not the service life arrival time is within a second shaping time when the service life arrival time is within a first shaping time in the service life determination. The first shaping time is a shaping time estimated based on the first shaping data. The second shaping time is a shaping time estimated based on the second shaping data. The configuration of the three-dimensional shaping apparatus 100 in the fourth embodiment is the same as that in the first embodiment, and therefore, the description thereof will be omitted.

Step S305 to Step S315 in FIG. 12 are the same as Step S105 to Step S115 in FIG. 4, and therefore, the description thereof will be omitted.

In Step S320, the control unit 500 calculates the first shaping time. The first shaping time is calculated based on the first shaping data and control values when the plasticizing section 30 and the moving mechanism section 400 are controlled.

In Step S325, the control unit 500 calculates the second shaping time. The second shaping time is calculated based on the second shaping data and control values when the plasticizing section 30 and the moving mechanism section 400 are controlled.

In Step S330, the control unit 500 makes service life determination to determine whether or not the first service life arrival time is within the first shaping time. In this embodiment, the control unit 500 makes the service life determination by comparing the residual time of the heater 35 with the first shaping time in the same manner as in Step S125 shown in FIG. 4.

When it is determined that the first service life arrival time is within the first shaping time in Step S330, in Step S335, the control unit 500 makes service life determination to determine whether or not the first service life arrival time is within the second shaping time. In this embodiment, the control unit 500 makes the service life determination by comparing the residual time of the heater 35 with the second shaping time in the same manner as making the service life determination by comparing the residual time of the heater 35 with the first shaping time in Step S330.

When it is determined that the first service life arrival time is within the second shaping time in Step S335, in Step S340, the control unit 500 controls the notification section 800 to notify a user of first service life information. The first service life information is information representing a result of the service life determination and is information indicating that the first service life arrival time is within the first shaping time and the second shaping time.

When it is determined that the first service life arrival time is not within the second shaping time in Step S335, in Step S345, the control unit 500 controls the notification section 800 to notify a user of second service life information. The second service life information is information representing a result of the service life determination and is service life information indicating that the first service life arrival time is not within the second shaping time. The user can, for example, instruct the control unit 500 to shape a three-dimensional shaped article according to the second shaping data before shaping the three-dimensional shaped article according to the first shaping data based on the second service life information. The second service life information may include, for example, information indicating that the first service life arrival time is within the first shaping time. Further, in Step S335, the control unit 500 may, for example, advise a user to start shaping a three-dimensional shaped article according to the second shaping data.

In Step S350, the control unit 500 makes the three-dimensional shaping apparatus 100 wait until a shaping start instruction is acquired by the instruction acquisition section 750. When the shaping start instruction is acquired by the instruction acquisition section 750, the control unit 500 makes the process proceed to Step S355 from Step S350. When Step S350 is executed after Step S340, a user can, for example, make a shaping start instruction to start shaping a three-dimensional shaped article according to the first shaping data or the second shaping data after replacing the deteriorated heater 35 with another heater 35 that is not deteriorated. When Step S350 is executed after Step S345, a user can, for example, make a shaping start instruction to start shaping a three-dimensional shaped article according to the second shaping data based on the second service life information.

In Step S355, the control unit 500 performs shaping of a three-dimensional shaped article. When Step S355 is executed after Step S350, the control unit 500 shapes a three-dimensional shaped article according to the first shaping data or the second shaping data in response to the shaping start instruction made by the user during waiting. Step S355 is also executed when it is determined that the first service life arrival time is not within the shaping time in Step S330. In that case, in Step S355, a three-dimensional shaped article is shaped according to the first shaping data.

According also to the three-dimensional shaping apparatus 100 of the fourth embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, when the first service life arrival time is within the first shaping time, the control unit 500 determines whether or not the service life arrival time is within the second shaping time. According to this, even if the first service life arrival time is within the first shaping time, when the first service life arrival time is not within the second shaping time, the control unit 500 can shape a three-dimensional shaped article according to the second shaping data. Therefore, the heater 35 can be used for a longer period of time until the heater 35 is replaced with a new one.

Further, in this embodiment, when the first service life arrival time is not within the second shaping time, the control unit 500 controls the notification section 800 to make a notification of the service life information indicating that the first service life arrival time is not within the second shaping time before shaping the three-dimensional shaped article. Therefore, a user can, for example, make a shaping start instruction to start shaping a three-dimensional shaped article according to the second shaping data for the control unit 500 based on the service life information and shape a three-dimensional shaped article according to the second shaping data.

In another embodiment, when the second service life arrival time is within the first shaping time, the control unit 500 may determine whether or not the second service life arrival time is within the second shaping time. Further, when the second service life arrival time is not within the second shaping time, the control unit 500 may control the notification section 800 to make a notification of the service life information indicating that the second service life arrival time is not within the second shaping time before shaping the three-dimensional shaped article. In that case, the control unit 500 can, for example, execute the above-mentioned process in the same configuration as the three-dimensional shaping apparatus 100b of the second embodiment.

Further, in another embodiment, when the service life arrival time is not within the second shaping time, the control unit 500 need not make a notification of the service life information indicating that the service life arrival time is not within the second shaping time. In that case, the control unit 500 may, for example, start shaping the three-dimensional shaped article according to the second shaping data without notifying a user.

E. Fifth Embodiment

Figure 13:
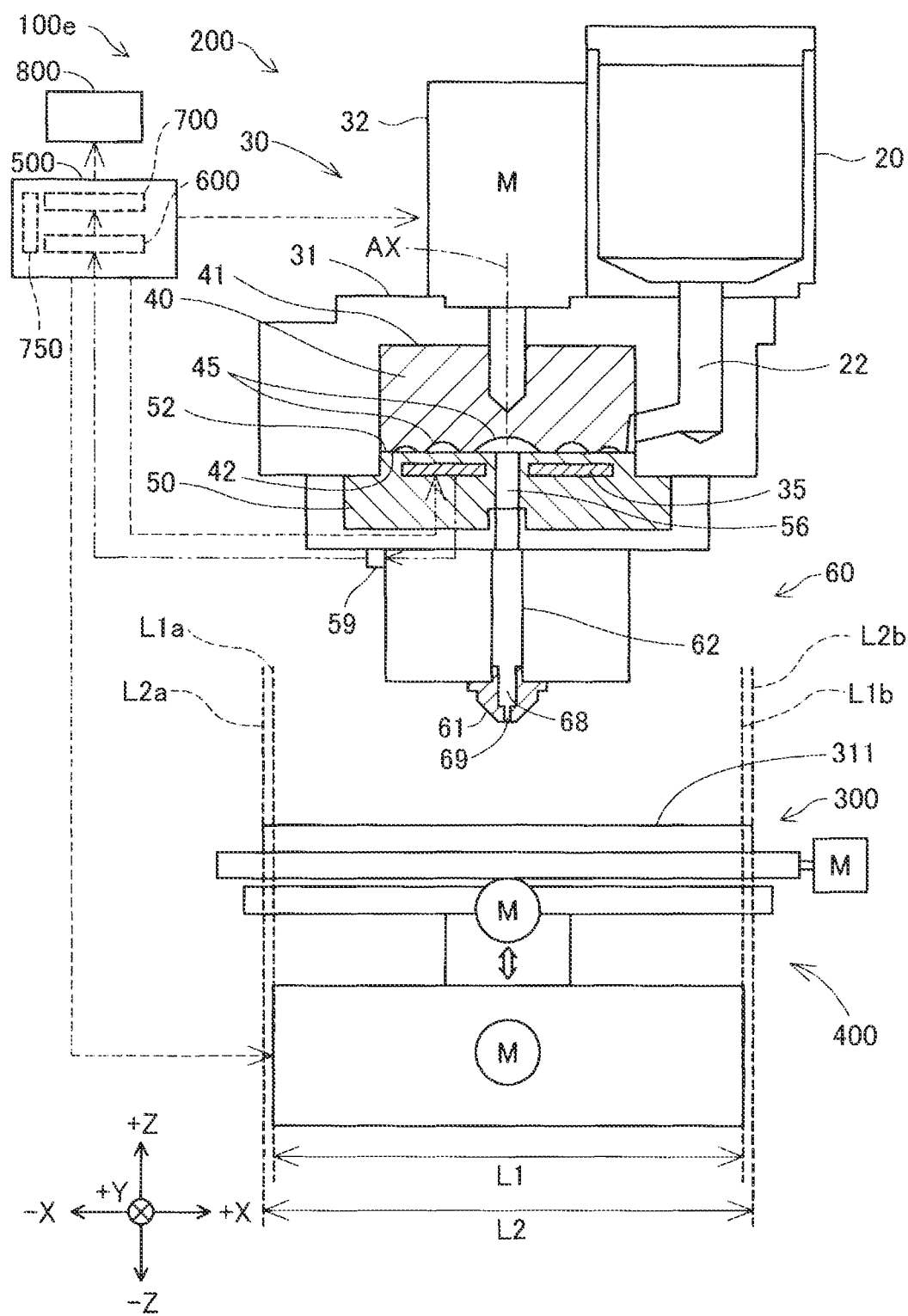
FIG. 13 is a view showing a schematic configuration of a three-dimensional shaping apparatus according to a fifth embodiment.

FIG. 13 is a view showing a schematic configuration of a three-dimensional shaping apparatus 100e according to a fifth embodiment. In this embodiment, the control unit 500 not only predicts the service life arrival time of the heater 35, but also predicts the service life arrival time of the moving mechanism section 400 in the three-dimensional shaping process. Points that are not particularly described with respect to the three-dimensional shaping apparatus 100e are the same as those of the first embodiment.

In FIG. 13, a region L1 and a region L2 are shown. The region L1 and the region L2 are planar regions along the X direction and the Y direction that are extending directions of the shaping face 311. In FIG. 13, a position L1a that is an end in the −X direction of the region L1, a position L1b that is an end in the +X direction of the region L1, a position L2a that is an end in the −X direction of the region L2, and a position L2b that is an end in the +X direction of the region L2 are shown, respectively. Although not shown in FIG. 13, the region L1 and the region L2 have one end and the other end of each region also in the Y direction.

The region L1 is a movable range of the ejection section 60 controlled by the control unit 500. Specifically, when the control unit 500 controls the moving mechanism section 400 to move the ejection section 60, the control unit 500 calculates a relative position of the ejection section 60 to the stage 300 from a control value of the moving mechanism section 400 and controls the control value of the moving mechanism section 400 so that the nozzle 61 does not move outside the region L1. That is, the region L1 is a so-called movable range on software. A coordinate indicating the position L1a or the position L2a is sometimes referred to as "soft limit". The region L2 is a so-called movable range on hardware of the ejection section 60 to be controlled by a limit switch (not shown) or the like. The region L2 may be controlled by, for example, a proximity switch utilizing a photoelectric sensor, a magnetic sensor, or the like. The region L1, for example, may include a region different from a region where a three-dimensional shaped article is shaped, and for example, may include a region for ejecting a shaping material that is not utilized for shaping a shaped article. Further, when the control unit 500, for example, recognizes the movement of the nozzle 61 to the outside of the region L1, the control unit 500 may make a notification of error information via the notification section 800 while regulating the movement of the ejection section 60 to the outside of the region L1.

Figure 14:
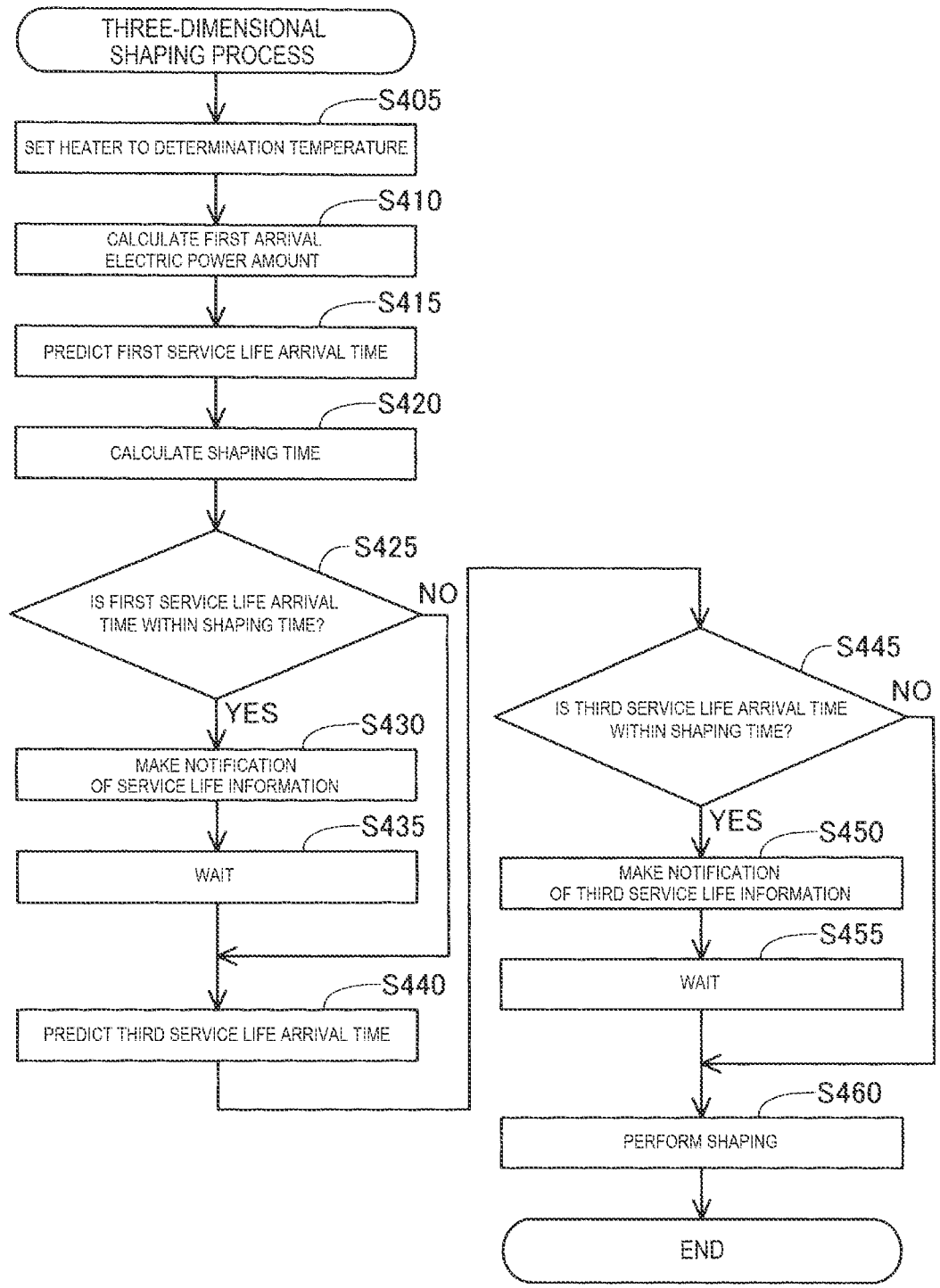
FIG. 14 is a process chart showing a shaping process for a three-dimensional shaped article according to the fifth embodiment.

FIG. 14 is a process chart showing a shaping process for a three-dimensional shaped article in a fifth embodiment. Step S405 to Step S435 are the same as Step S105 to Step S135 in FIG. 4, and therefore, the description thereof will be omitted.

In Step S440, the prediction section 700 predicts a third service life arrival time. The third service life arrival time refers to a time when a specific member other than the heater 35 and the drive motor 32 arrives at the end of its service life. In this embodiment, the prediction section 700 predicts the service life arrival time of the moving mechanism section 400 as the third service life arrival time from the observation result of the moving mechanism section 400 by the state observation section 600. In another embodiment, a computer or the like that is a separate body from the state observation section 600 or the prediction section 700 may be configured to make state observation or predict the service life arrival time of the moving mechanism section 400.

The state observation section 600 observes a moving time required for the movement of the ejection section 60 that moves a fixed distance as the state of the moving mechanism section 400. Specifically, in this embodiment, the control unit 500 moves the ejection section 60 from the position L1a to the position L1b. The state observation section 600 measures the moving speed and the moving time of the ejection section 60 at that time. At that time, for example, when a motor that constitutes the moving mechanism section 400 is deteriorated, the acceleration of the ejection section 60 decreases and the moving time increases. In the state observation of the ejection section 60, by measuring the moving speed and the moving time of the ejection section 60 when moving from the position L1a to the position L1b, the moving speed and the moving time when the ejection section 60 moves a long distance within the region L1 are measured, and therefore, the accuracy of observation of the state of the moving mechanism section 400 is increased while suppressing breakdown of the moving mechanism section 400. In another embodiment, the state observation section 600 may measure the moving speed and the moving time of the ejection section 60 that moves between other points. In addition, the state observation section 600, for example, may observe the state of the moving mechanism section 400 by performing statistical processing of a plurality of measurement results measured by a plurality of reciprocal movements of the ejection section 60.

Figure 15:
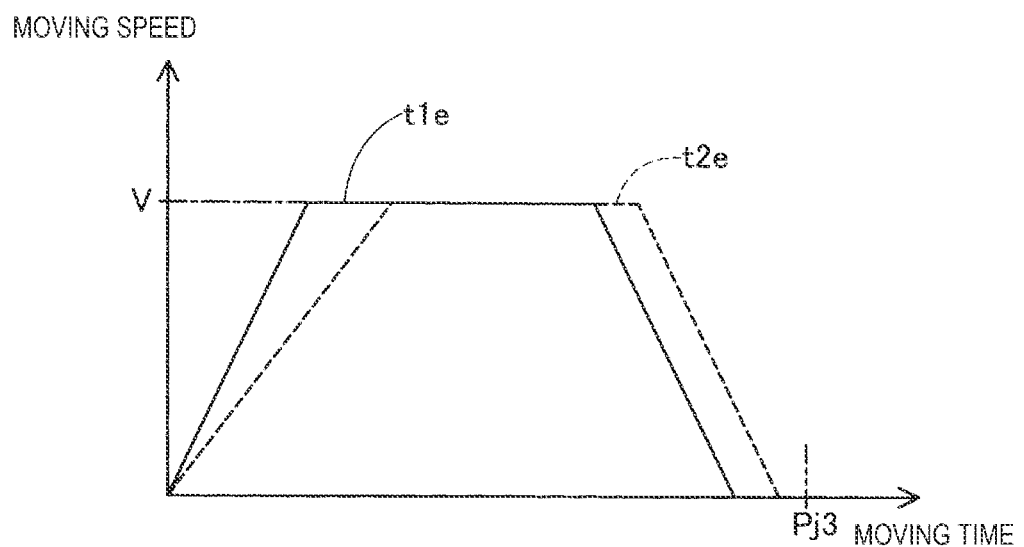
FIG. 15 is a graph in which the horizontal axis represents a moving time of an ejection section and the vertical axis represents a moving speed of the ejection section.

FIG. 15 is a graph in which the horizontal axis represents the moving time of the ejection section 60 and the vertical axis represents the moving speed of the ejection section 60. FIG. 15 shows an example of results of measurement of the moving time and the moving speed of the ejection section 60 when the ejection section 60 is moved from the position L1a to the position L1b shown in FIG. 13. As shown in FIG. 15, the moving time of the ejection section 60 at an observation time t2e is longer than the moving time at an observation time t1e. Therefore, deterioration of the moving mechanism section 400 is in further progress at the observation time t2e than at the observation time t1e.

The prediction section 700 predicts the service life arrival time of the moving mechanism section 400 from the result of the state observation by the state observation section 600. In this embodiment, the prediction section 700 predicts the service life arrival time of the moving mechanism section 400 by predicting a time when the moving time of the ejection section 60 exceeds a third determination value Pj3. The prediction section 700 can predict the service life arrival time of the moving mechanism section 400 using, for example, an increase history of the moving time of the moving mechanism section 400 in the same manner as predicting the first service life arrival time using the increase history of the first arrival electric power amount in the first embodiment.

In Step S445, the control unit 500 determines whether or not the third service life arrival time is within the shaping time. That is, in this embodiment, the control unit 500 determines whether or not the service life arrival time of the moving mechanism section 400 is within the shaping time in Step S445.

When it is determined that the third service life arrival time is within the shaping time in Step S445, in Step S450, the control unit 500 controls the notification section 800 to notify a user of third service life information. The third service life information is information representing a determination result regarding the third service life arrival time in Step S445. In this embodiment, specifically, in Step S450, a user is notified of information indicating that the service life arrival time of the moving mechanism section 400 is within the shaping time. According to this, the user can, for example, replace a deteriorated part constituting the moving mechanism section 400 before the shaping step in Step S460. Note that in Step S450, the control unit 500 may, for example, advise a user to replace the deteriorated part.

In Step S455, the control unit 500 makes the three-dimensional shaping apparatus 100 wait until a shaping start instruction is acquired by the instruction acquisition section 750. When the shaping start instruction is acquired by the instruction acquisition section 750, the control unit 500 makes the process proceed to Step S460 from Step S455. In Step S460, the control unit 500 performs shaping of a three-dimensional shaped article. A user can, for example, make a shaping start instruction after replacing the deteriorated part constituting the moving mechanism section 400 with another part that is not deteriorated. Step S460 is also executed when it is determined that the third service life arrival time is not within the shaping time in Step S445.

According also to the three-dimensional shaping apparatus 100e of the fifth embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, when the service life arrival time of the moving mechanism section 400 is within the shaping time, the control unit 500 controls the notification section 800 to make a notification of information regarding the service life of the moving mechanism section 400. According to this, a user can, for example, replace a deteriorated part constituting the moving mechanism section 400 with another part that is not deteriorated before shaping a three-dimensional shaped article based on the information notified by the notification section 800. Therefore, even when deterioration of the moving mechanism section 400 is in progress, a possibility that replacement of the part is needed in the middle of shaping of a three-dimensional shaped article is decreased, and deterioration of shaping quality due to suspension or resumption of shaping accompanying the replacement of the part is suppressed.

F. Sixth Embodiment

Figure 16:
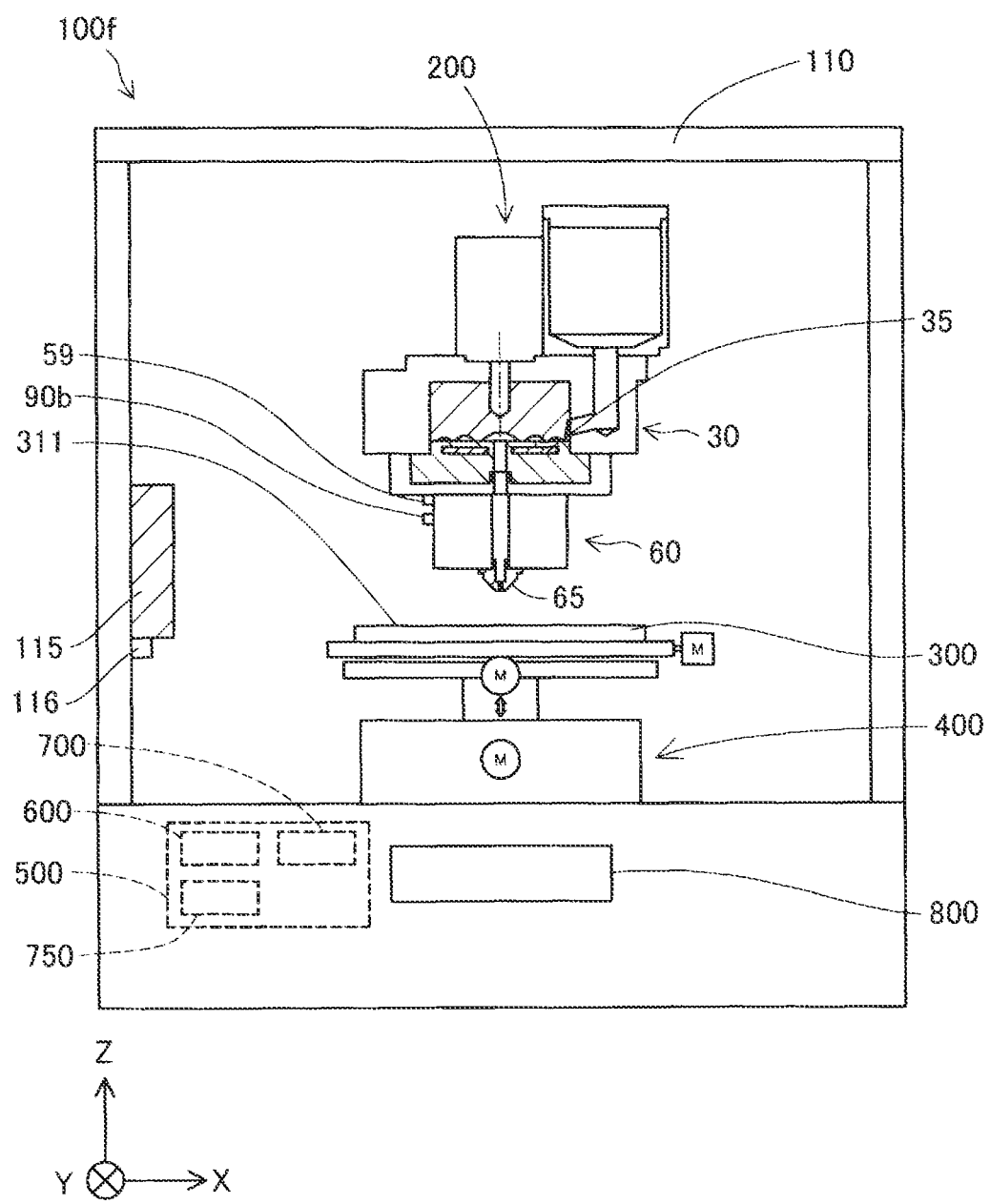
FIG. 16 is a view showing a schematic configuration of a three-dimensional shaping apparatus according to a sixth embodiment.

FIG. 16 is a view showing a schematic configuration of a three-dimensional shaping apparatus 100f according to a sixth embodiment. The three-dimensional shaping apparatus 100f of this embodiment includes a chamber 110 unlike in the first embodiment. Further, the three-dimensional shaping apparatus 100f includes a temperature acquisition section 90b, a chamber heating section 115, and a third sensor section 116 in the chamber 110. Points that are not particularly described with respect to the three-dimensional shaping apparatus 100f are the same as those of the first embodiment.

The chamber 110 is a housing that houses part of the three-dimensional shaping apparatus 100f. In this embodiment, in the chamber 110, the shaping unit 200, the stage 300, and the moving mechanism section 400 are housed. In the chamber 110, for example, an opening portion, a door that opens and closes the opening portion, or the like may be provided. In that case, a user can take out a shaped article in the chamber 110 from the opening portion by opening the door to bring the opening portion into an open state.

The temperature acquisition section 90b is constituted by the same temperature sensor as the temperature acquisition section 90 in the second embodiment. The temperature acquisition section 90b acquires a temperature in the chamber 110.

The chamber heating section 115 is provided in the chamber 110. The chamber heating section 115 heats a space in the chamber 110. The chamber heating section 115, for example, may be constituted by a heater that heats the inside of the chamber 110 or may be constituted by a circulation device that circulates air inside and outside the chamber 110 while taking in heated air from the outside of the chamber 110. The chamber heating section 115 of this embodiment is controlled by the control unit 500. The control unit 500 adjusts the temperature inside the chamber 110 by adjusting the output of the chamber heating section 115 while referring to the temperature acquired by the temperature acquisition section 90b.

The third sensor section 116 is provided in the chamber 110. The third sensor section 116 measures a temperature of the chamber heating section 115 and an electric power amount consumed by the chamber heating section 115. The third sensor section 116 is constituted by, for example, a wattmeter and the same temperature sensor as that of the temperature acquisition section 90b.

In this embodiment, the control unit 500 executes the same three-dimensional shaping process as the process in the fifth embodiment shown in FIG. 14. In Step S440 of this embodiment, the prediction section 700 predicts the service life arrival time of the chamber heating section 115 from an observation result of the chamber heating section 115 by the state observation section 600 as the third service life arrival time. In another embodiment, a computer or the like that is a separate body from the state observation section 600 or the prediction section 700 may be configured to make state observation or predict the service life arrival time of the chamber heating section 115.

Figure 17:
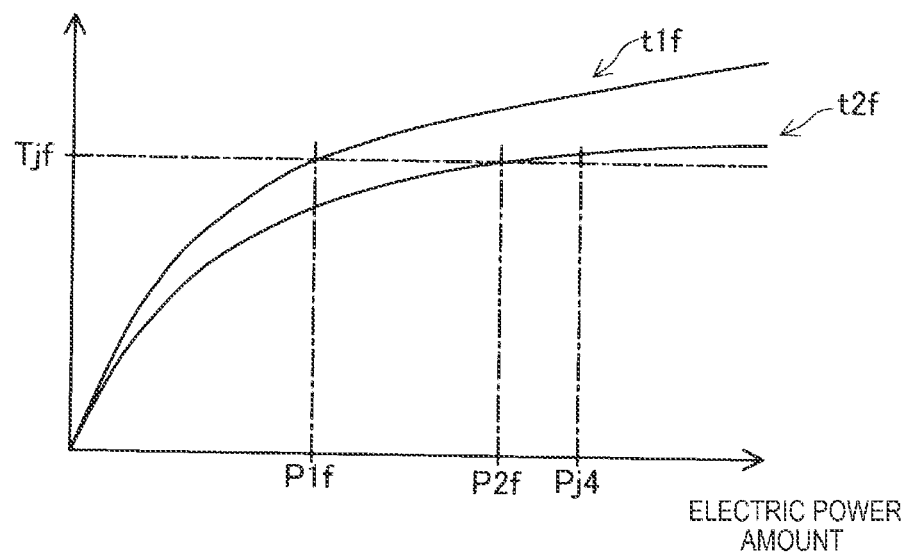
FIG. 17 is a graph in which the horizontal axis represents an electric power amount consumed by a chamber heating section and the vertical axis represents a temperature of the chamber heating section.

FIG. 17 is a graph in which the horizontal axis represents the electric power amount consumed by the chamber heating section 115 and the vertical axis represents the temperature of the chamber heating section 115. The state observation section 600 of this embodiment can, for example, make state observation by calculating a third electric power amount required for the temperature of the chamber heating section 115 to arrive at a determination temperature Tjf in the same manner as the state observation of the heater 35 in the first embodiment. As shown in FIG. 17, the third arrival electric power amount at an observation time t2f is an electric power amount P2f and is larger than a third arrival electric power amount P1f at an observation time t1f. Therefore, deterioration of the chamber heating section 115 is in further progress at the observation time t2f than at the observation time t1f.

The prediction section 700 predicts the service life arrival time of the chamber heating section 115 from the result of the state observation by the state observation section 600. In this embodiment, the prediction section 700 predicts the service life arrival time of the chamber heating section 115 by predicting a time when the third arrival electric power amount exceeds a fourth determination value Pj4. The prediction section 700 can predict the service life arrival time of the chamber heating section 115 using, for example, an increase history of the third arrival electric power amount in the same manner as predicting the first service life arrival time using the increase history of the first arrival electric power amount in the first embodiment.

In this embodiment, in Step S445, the control unit 500 determines whether or not the third service life arrival time is within the shaping time. That is, in this embodiment, the control unit 500 determines whether or not the service life arrival time of the chamber heating section 115 is within the shaping time in Step S445. When it is determined that the third service life arrival time is within the shaping time in Step S445, in Step S450, the control unit 500 controls the notification section 800 to notify a user of information indicating that the service life arrival time of the chamber heating section 115 is within the shaping time.

According also to the three-dimensional shaping apparatus 100f of the sixth embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, when the service life arrival time of the chamber heating section 115 is within the shaping time, the control unit 500 controls the notification section 800 to make a notification of information regarding the service life of the chamber heating section 115. According to this, a user can, for example, replace a deteriorated part constituting the chamber heating section 115 with another part that is not deteriorated before shaping a three-dimensional shaped article based on the information notified by the notification section 800. Therefore, even when deterioration of the chamber heating section 115 is in progress, a possibility that replacement of the part is needed in the middle of shaping of a three-dimensional shaped article is decreased, and deterioration of shaping quality due to suspension or resumption of shaping accompanying the replacement of the part is suppressed.

G. Seventh Embodiment

Figure 18:
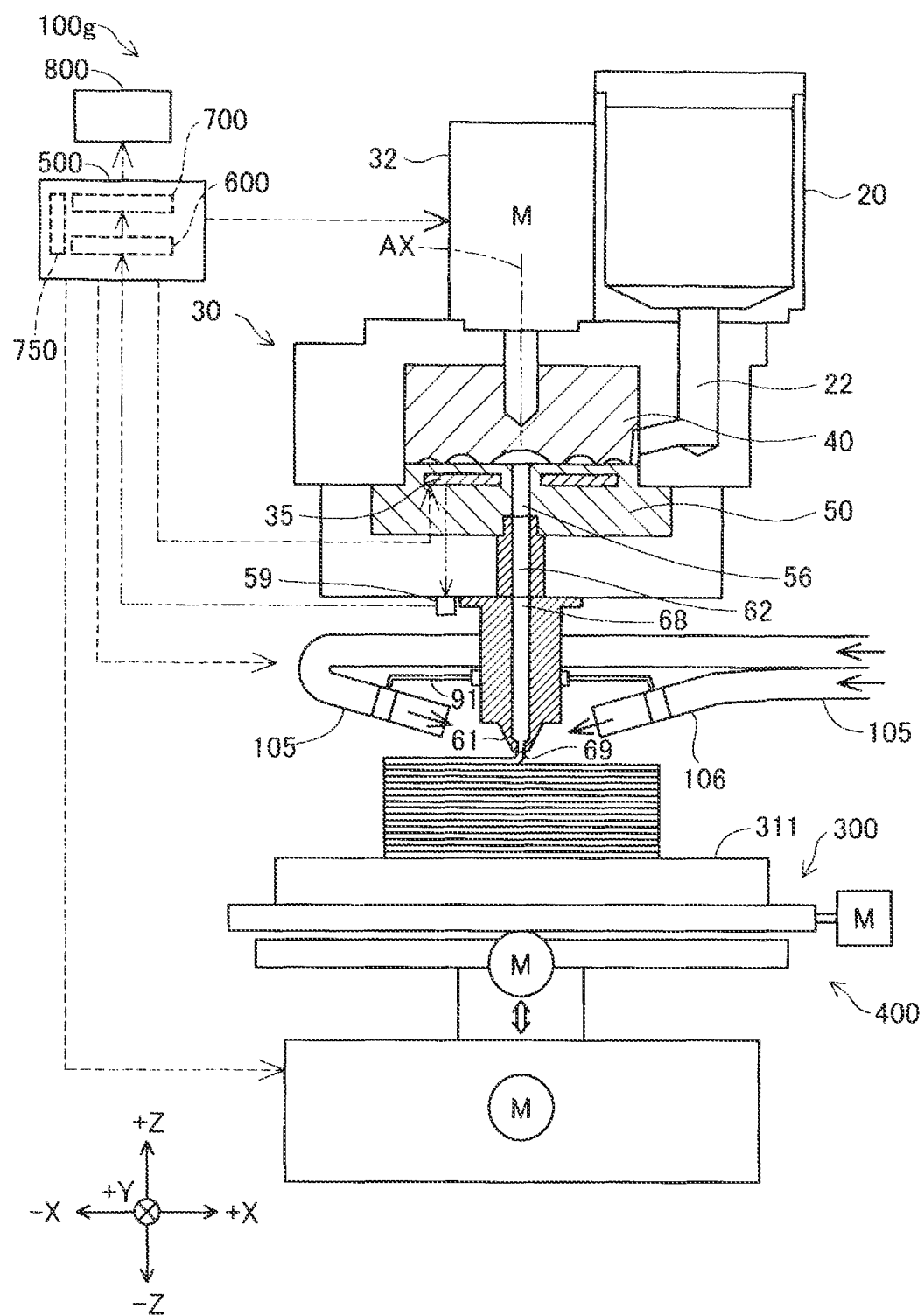
FIG. 18 is a view showing a schematic configuration of a three-dimensional shaping apparatus according to a seventh embodiment.

FIG. 18 is a view showing a schematic configuration of a three-dimensional shaping apparatus 100g according to a seventh embodiment. The three-dimensional shaping apparatus 100g of this embodiment includes an air blowing section 105 unlike in the first embodiment. Points that are not particularly described with respect to the three-dimensional shaping apparatus 100g are the same as those of the first embodiment.

The air blowing section 105 includes four tubes 106 arranged at equal angle intervals around the ejection section 60. In FIG. 18, only two tubes 106 are shown for the sake of illustration. These tubes 106 are, for example, fixed to the ejection section 60 or the screw case 31 through a clamp 91 or the like. Into each tube 106, compressed air is introduced, and air is blown from a tip of each tube 106 toward the shaping material ejected onto the shaping face 311 from the ejection section 60. The air blowing section 105 can decrease the temperature of the shaping material on the shaping face 311 and promote solidification of the shaping material by blowing air to the shaping material on the shaping face 311. Further, the air blowing section 105 can adjust the solidification of the shaping material by adjusting the amount of air blown to the shaping material so as to adjust the rate of decreasing the temperature of the shaping material. The amount of air blown from the air blowing section 105 is adjusted by the control unit 500. Specifically, the control unit 500 adjusts the amount of blown air by adjusting the amount of compressed air introduced into the tube 106. Note that, for example, when a sensor that measures the temperature of the shaping material on the shaping face 311 is provided, the control unit 500 may adjust the amount of blown air according to the temperature of the shaping material on the shaping face 311.

In this embodiment, the control unit 500 executes the same three-dimensional shaping process as the process in the fifth embodiment shown in FIG. 14. In Step S440 of this embodiment, the prediction section 700 predicts the service life arrival time of the air blowing section 105 from an observation result of the blowing section 105 by the state observation section 600 as the third service life arrival time. In another embodiment, a computer or the like that is a separate body from the state observation section 600 or the prediction section 700 may be configured to make state observation or predict the service life arrival time of the air blowing section 105.

Figure 19:
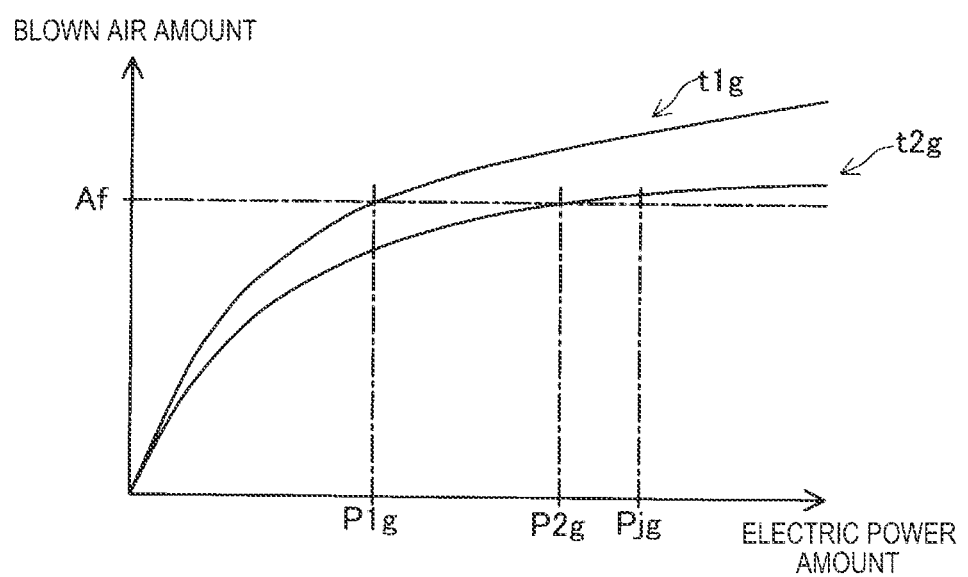
FIG. 19 is a graph in which the horizontal axis represents an electric power amount consumed by an air blowing section and the vertical axis represents an air blowing amount.

FIG. 19 is a graph in which the horizontal axis represents an electric power amount consumed by the air blowing section 105 and the vertical axis represents a blown air amount. The electric power amount and the blown air amount shown in FIG. 19 are measured by, for example, a wattmeter and a flow meter (both not shown), respectively. The state observation section 600 of this embodiment can, for example, make state observation by calculating a fourth arrival electric power amount required for the blown air amount to arrive at a determination blown air amount Af in the same manner as the state observation of the heater 35 in the first embodiment. As shown in FIG. 19, the fourth arrival electric power amount at an observation time t2g is an electric power amount P2g and is larger than a third arrival electric power amount P1g at an observation time t1g. Therefore, deterioration of the air blowing section 105 is in further progress at the observation time t2g than at the observation time t1g.

The prediction section 700 predicts the service life arrival time of the air blowing section 105 from the result of the state observation by the state observation section 600. In this embodiment, the prediction section 700 predicts the service life arrival time of the air blowing section 105 by predicting a time when the fourth arrival electric power amount exceeds a fifth determination value Pj5. The prediction section 700 can predict the service life arrival time of the air blowing section 105 using, for example, an increase history of the fourth arrival electric power amount in the same manner as predicting the first service life arrival time using the increase history of the first arrival electric power amount in the first embodiment.

In this embodiment, in Step S445, the control unit 500 determines whether or not the third service life arrival time is within the shaping time. That is, in this embodiment, the control unit 500 determines whether or not the service life arrival time of the air blowing section 105 is within the shaping time in Step S445. When it is determined that the third service life arrival time is within the shaping time in Step S445, in Step S450, the control unit 500 controls the notification section 800 to notify a user of information indicating that the service life arrival time of the air blowing section 105 is within the shaping time.

According also to the three-dimensional shaping apparatus 100g of the seventh embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, when the service life arrival time of the air blowing section 105 is within the shaping time, the control unit 500 controls the notification section 800 to make a notification of information regarding the service life of the air blowing section 105. According to this, a user can, for example, replace a deteriorated part constituting the air blowing section 105 with another part that is not deteriorated before shaping a three-dimensional shaped article based on the information notified by the notification section 800. Therefore, even when deterioration of the air blowing section 105 is in progress, a possibility that replacement of the part is needed in the middle of shaping of a three-dimensional shaped article is decreased, and deterioration of shaping quality due to suspension or resumption of shaping accompanying the replacement of the part is suppressed.

In another embodiment, the state observation section 600 may, for example, measure the temperature of the upper face of the shaping face 311 by the temperature sensor, and observe the electric power amount consumed by the air blowing section 105 with respect to the temperature of the upper face of the shaping face 311 as the state of the air blowing section 105.

H. Eighth Embodiment

Figure 20:
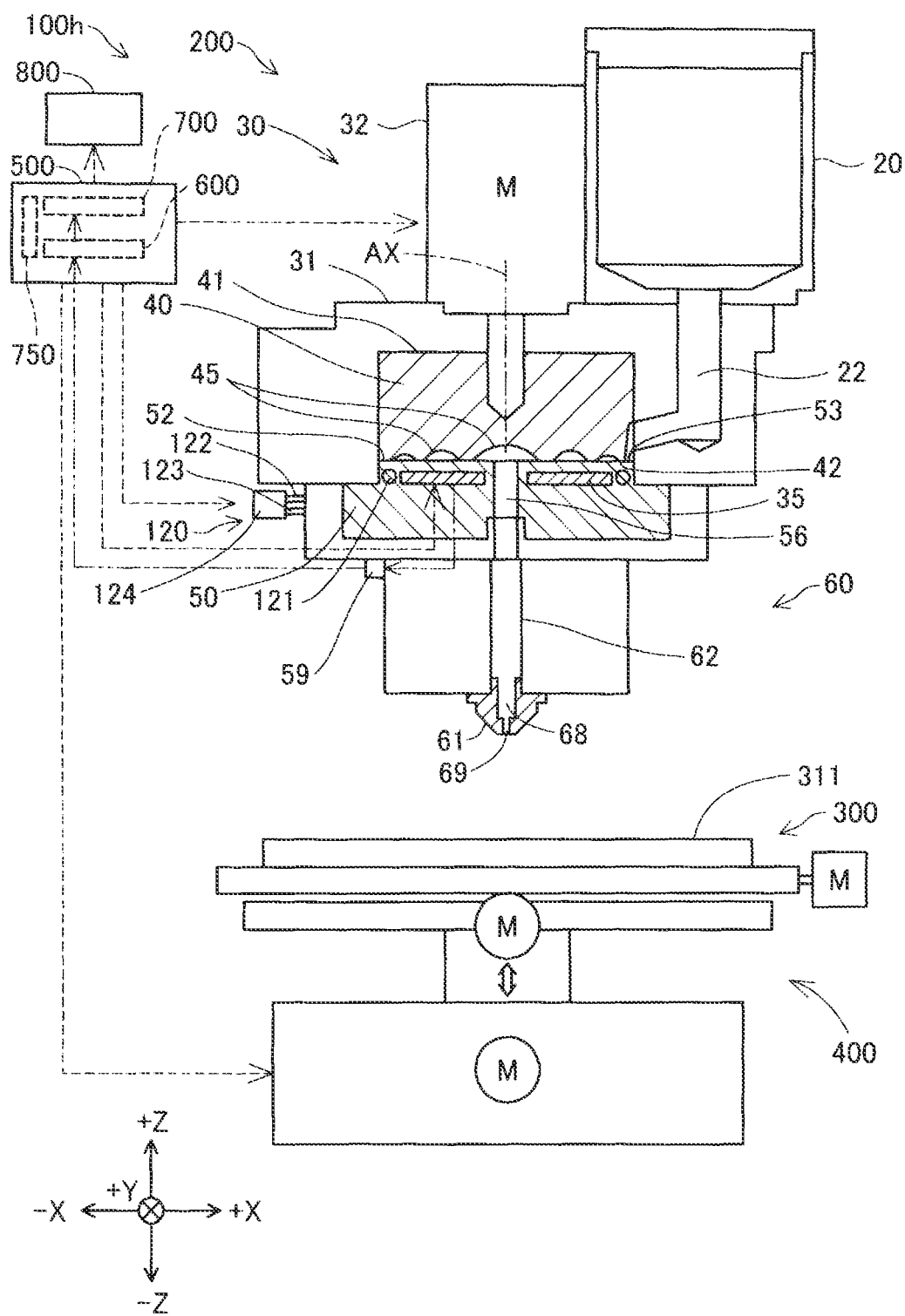
FIG. 20 is a view showing a schematic configuration of a three-dimensional shaping apparatus according to an eighth embodiment.

FIG. 20 is a view showing a schematic configuration of a three-dimensional shaping apparatus 100h according to an eighth embodiment. The three-dimensional shaping apparatus 100h of this embodiment includes a cooling section 120 for cooling the plasticizing section 30 unlike in the first embodiment. Points that are not particularly described with respect to the three-dimensional shaping apparatus 100h are the same as those of the first embodiment.

The cooling section 120 of this embodiment includes a refrigerant flow channel 121 provided along an outer circumference of the barrel 50, an inlet portion 122 from which a refrigerant is introduced into the refrigerant flow channel 121, an outlet portion 123, which communicates with the refrigerant flow channel 121, and from which the refrigerant is discharged outside the refrigerant flow channel 121, and a refrigerant circulation device 124. The refrigerant circulation device 124 of this embodiment includes a pump and a freezing machine for cooling the refrigerant (both not shown). In another embodiment, the refrigerant flow channel 121 need not be provided in the barrel 50, or may be provided in, for example, the screw 40.

The cooling section 120 is controlled by the control unit 500. Specifically, the control unit 500 cools the refrigerant in the refrigerant circulation device 124 while circulating the refrigerant inside and outside the refrigerant flow channel 121 through the inlet portion 122 and the outlet portion 123 by driving the refrigerant circulation device 124. The control unit 500 cools the plasticizing section 30 by circulating the refrigerant in this manner.

The control unit 500 can adjust the temperature of the plasticizing section 30 by adjusting the output of the cooling section 120. For example, an excessive increase in temperature in the plasticizing section 30 is suppressed by increasing the output of the cooling section 120. Further, when the refrigerant flow channel 121 is provided along the outer circumference of the barrel 50 as in this embodiment, the control unit 500 can keep the temperature in the vicinity of the outer circumference of the barrel 50 low and can keep the temperature in the vicinity of a central portion of the barrel 50 high while suppressing an increase in the temperature of the barrel 50 as a whole by adjusting the output of the cooling section 120. When the output of the cooling section 120 is adjusted, the control unit 500, for example, may adjust the flow rate of the refrigerant in the cooling section 120 by adjusting the output of the pump of the refrigerant circulation device 124 or may adjust the temperature of the refrigerant by adjusting the output of the freezing machine.

In this embodiment, the control unit 500 executes the same three-dimensional shaping process as the process in the fifth embodiment shown in FIG. 14. In Step S440 of this embodiment, the prediction section 700 predicts the service life arrival time of the cooling section 120 from an observation result of the cooling section 120 by the state observation section 600 as the third service life arrival time. In another embodiment, a computer or the like that is a separate body from the state observation section 600 or the prediction section 700 may be configured to make state observation or predict the service life arrival time of the cooling section 120.

Figure 21:
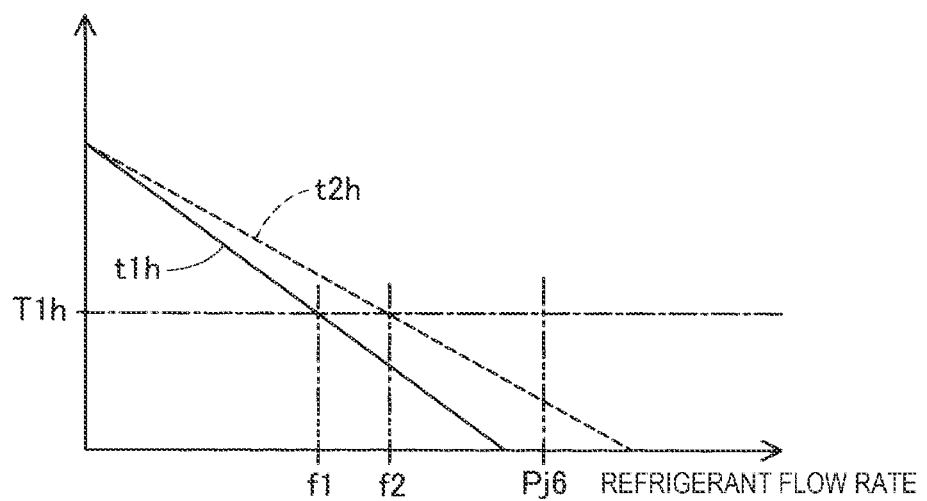
FIG. 21 is a graph in which the horizontal axis represents a refrigerant flow rate and the vertical axis represents a cooling target part temperature.

FIG. 21 is a graph in which the horizontal axis represents a refrigerant flow rate and the vertical axis represents a cooling target part temperature. The refrigerant flow rate is the flow rate of the refrigerant flowing through the refrigerant flow channel 121. The cooling target part temperature is the temperature of a cooling target part 53 to be cooled by the cooling section 120. In this embodiment, the cooling target part 53 constitutes a part of an outer circumferential portion of the barrel 50 as shown in FIG. 20. The refrigerant flow rate and the cooling target part temperature are measured by, for example, a flow meter and a temperature sensor (both not shown), respectively. The state observation section 600 observes an arrival flow rate that is the flow rate of the refrigerant when the cooling target part is cooled to a temperature lowered than an arrival temperature T1h as the state of the cooling section 120. As shown in FIG. 21, an arrival flow rate f2 at an observation time t2h is larger than an arrival flow rate f1 at an observation time t1h. That is, at the observation time t2h, as compared with the case at the observation time t1h, the refrigerant flow rate for realizing the arrival temperature T1h is increased and the efficiency for cooling the refrigerant of the cooling section 120 is decreased. Therefore, deterioration of the cooling section 120 is in further progress at the observation time t2h than at the observation time t1h.

The prediction section 700 predicts the service life arrival time of the cooling section 120 from the result of the state observation by the state observation section 600. In this embodiment, the prediction section 700 predicts the service life of the cooling section 120 by predicting a time when the arrival flow rate exceeds a sixth determination value Pj6. The prediction section 700 can predict the service life arrival time of the cooling section 120 using, for example, an increase history of the arrival flow rate in the same manner as predicting the first service life arrival time using the increase history of the first arrival electric power amount in the first embodiment.

In this embodiment, in Step S445, the control unit 500 determines whether or not the third service life arrival time is within the shaping time. That is, in this embodiment, the control unit 500 determines whether or not the service life arrival time of the cooling section 120 is within the shaping time in Step S445. When it is determined that the third service life arrival time is within the shaping time in Step S445, in Step S450, the control unit 500 controls the notification section 800 to notify a user of information indicating that the service life arrival time of the cooling section 120 is within the shaping time.

According also to the three-dimensional shaping apparatus 100h of the eighth embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, when the service life arrival time of the cooling section 120 is within the shaping time, the control unit 500 controls the notification section 800 to make a notification of information regarding the service life of the cooling section 120. According to this, a user can, for example, replace a deteriorated part constituting the cooling section 120 with another part that is not deteriorated before shaping a three-dimensional shaped article based on the service life information notified by the notification section 800. Therefore, even when deterioration of the cooling section 120 is in progress, a possibility that replacement of the part is needed in the middle of shaping of a three-dimensional shaped article is decreased, and deterioration of shaping quality due to suspension or resumption of shaping accompanying the replacement of the part is suppressed.

In another embodiment, the state observation section 600 may, for example, observe the electric power amount consumed by the cooling section 120 with respect to the temperature of the refrigerant flowing through the refrigerant flow channel 121 as the state of the cooling section 120.

I. Ninth Embodiment

Figure 22:
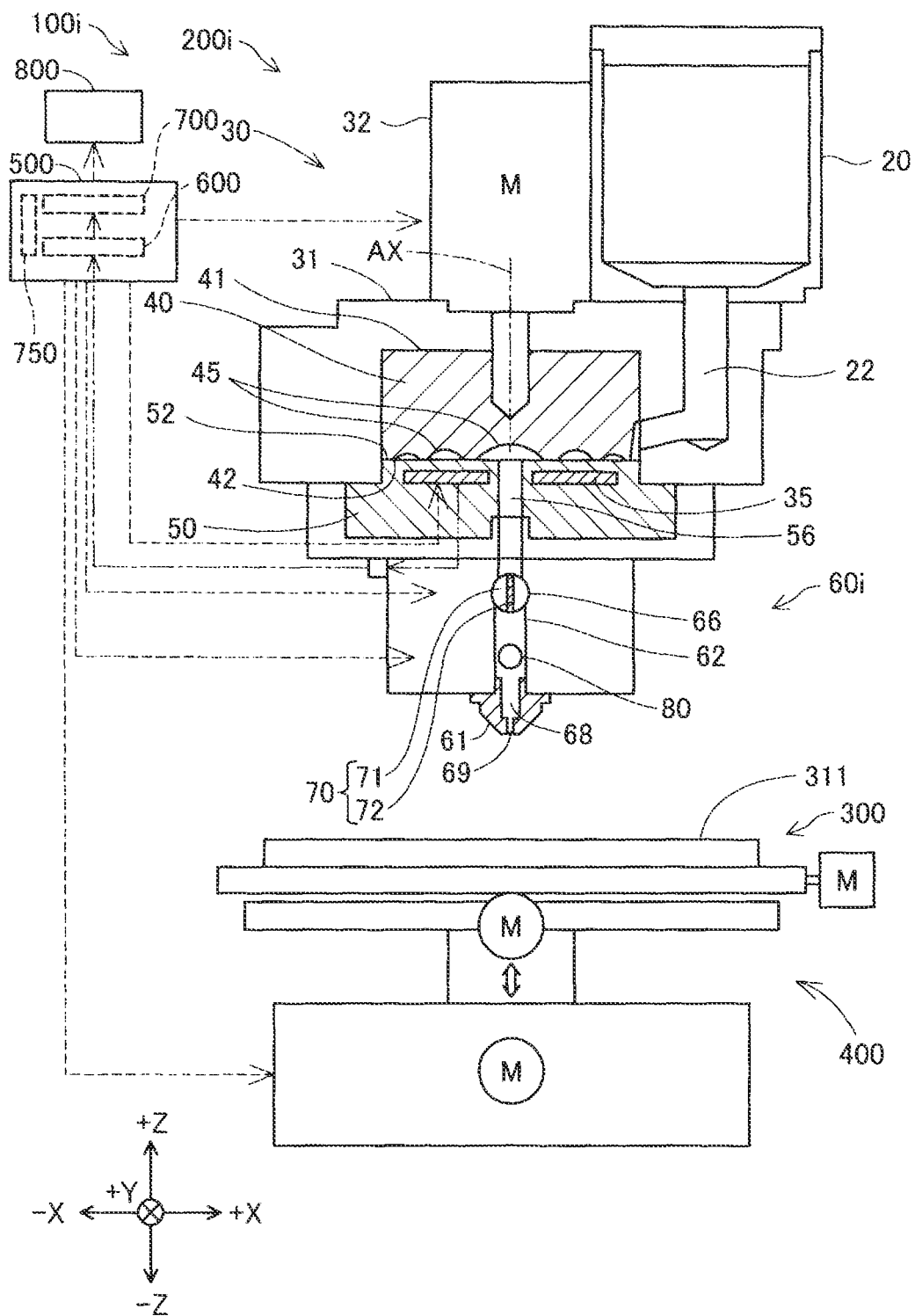
FIG. 22 is a view showing a schematic configuration of a three-dimensional shaping apparatus according to a ninth embodiment.

FIG. 22 is a view showing a schematic configuration of a three-dimensional shaping apparatus 100*i* according to a ninth embodiment. An ejection section 60*i* of a shaping unit 200*i* of this embodiment includes an ejection amount regulating section 70 and a suction section 80 unlike in the first embodiment. Points that are not particularly described with respect to the three-dimensional shaping apparatus 100*i* are the same as those of the first embodiment.

The ejection amount regulating section 70 is provided in the supply flow channel 62. The ejection amount regulating section 70 of this embodiment is constituted by a butterfly valve. The ejection amount regulating section 70 includes a drive shaft 71 that is a shaft-like member and a valve body 72 that has a plate shape and rotates with the rotation of the drive shaft 71. The drive shaft 71 rotates the valve body 72 by transmitting the rotational force of a motor (not shown) to the valve body 72. The drive shaft 71 is inserted into a crossing hole 66 so that a direction along the central axis of the drive shaft 71 and a flowing direction of the shaping material in the supply flow channel 62 cross each other.

The ejection amount regulating section 70 regulates the ejection amount by regulating the flow rate of the shaping material flowing through the supply flow channel 62. Specifically, the ejection amount regulating section 70 regulates the flow rate of the shaping material flowing through the supply flow channel 62 by changing the angle of rotation of the valve body 72. The degree of rotation of the valve body 72 is sometimes referred to as the valve opening ratio of the valve body 72. When a plate-shaped face of the valve body 72 becomes perpendicular to the flowing direction of the shaping material in the supply flow channel 62 by the rotation of the drive shaft 71, the valve opening ratio becomes 0. When the valve opening ratio is 0, the plasticizing section 30 and the nozzle 61 do not communicate with each other, and the ejection of the shaping material from the nozzle 61 is stopped. When the plate-shaped face of the valve body 72 becomes parallel to the flowing direction of the shaping material in the supply flow channel 62, the valve opening ratio becomes 100. The ejection amount regulating section 70 of this embodiment is controlled by the control unit 500.

Figure 23:
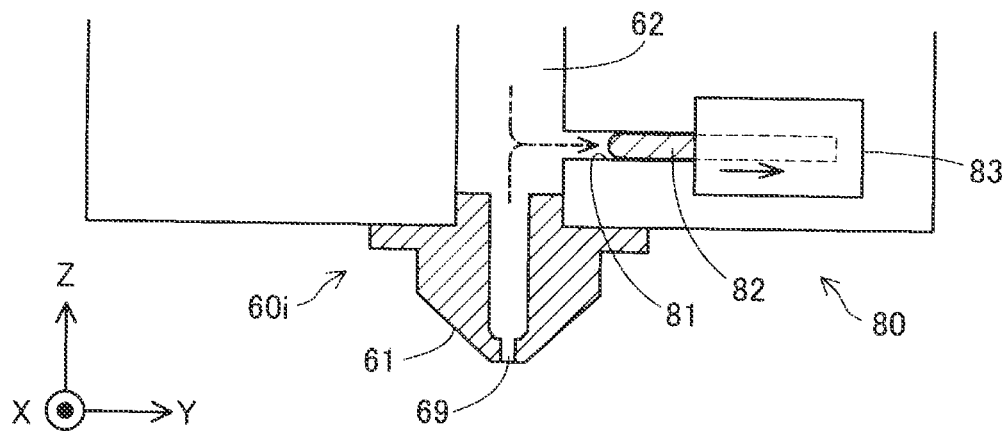
FIG. 23 is a view showing a schematic configuration of a suction section.

FIG. 23 is a view showing a schematic configuration of the suction section 80. The suction section 80 includes a cylinder 81 that has a cylindrical shape and is coupled downstream of the ejection amount regulating section 70 in the supply flow channel 62, a plunger 82 housed in the cylinder 81, and a plunger drive section 83 that drives the plunger 82. In this embodiment, the plunger drive section 83 is constituted by a motor that drives under the control of the control unit 500 and a rack and pinion that converts the rotation of the motor into movement in a translation direction along the axial direction of the cylinder 81. The plunger drive section 83, for example, may be constituted by a ball screw that converts the rotation of the motor into movement in a translation direction along the axial direction of the cylinder 81, or may be constituted by an actuator such as a solenoid mechanism or a piezo element.

As shown using the arrows in FIG. 23, when the plunger 82 moves in the +Y direction away from the supply flow channel 62, the pressure inside the cylinder 81 becomes negative, and therefore, the shaping material from the supply flow channel 62 to the nozzle 61 is sucked into the cylinder 81. On the other hand, when the plunger 82 moves in the −Y direction approaching the supply flow channel 62, the shaping material in the cylinder 81 is pushed out to the supply flow channel 62 by the plunger 82. Note that the movement of the plunger 82 toward the direction away from the supply flow channel 62 is sometimes referred to as backward movement of the plunger 82. In addition, the movement of the plunger 82 toward the direction approaching the supply flow channel 62 is sometimes referred to as forward movement of the plunger 82.

The control unit 500 causes the blunger 82 to move backward so as to suck the shaping material ejected from the ejection section 60*i* toward the cylinder 81, therefore can suppress tailing that is a phenomenon in which the shaping material drips from the nozzle hole 69 of the ejection section 60*i* and is formed into a string-like shape when stopping the ejection of the shaping material from the ejection section 60*i*. Note that suppression of this tailing is sometimes referred to as "tail cut". The control unit 500 can accurately control start or stop of the ejection of the shaping material from the ejection section 60*i* by controlling the ejection amount regulating section 70 and the suction section 80.

In this embodiment, the control unit 500 executes the same three-dimensional shaping process as the process in the fifth embodiment shown in FIG. 14. In Step S440 of this embodiment, the prediction section 700 predicts the service life arrival time of the ejection amount regulating section 70 from an observation result of the ejection amount regulating section 70 by the state observation section 600 as the third service life arrival time. In another embodiment, a computer or the like that is a separate body from the state observation section 600 or the prediction section 700 may be configured to make state observation or predict the service life arrival time of the ejection amount regulating section 70.

Figure 24:
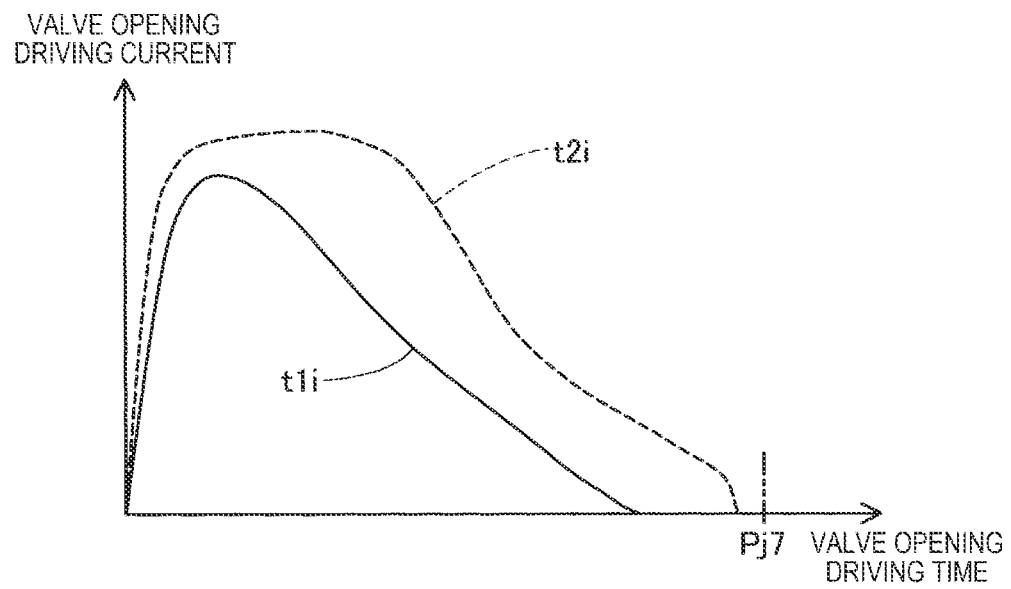
FIG. 24 is a graph in which the horizontal axis represents a valve opening driving time and the vertical axis represents a valve opening driving current.

FIG. 24 is a graph in which the horizontal axis represents a valve opening driving time of the ejection amount regulating section 70 and the vertical axis represents a valve opening driving current of the ejection amount regulating section 70. The valve opening driving time is a time required for changing the valve opening ratio of the valve body 72 of the ejection amount regulating section 70 from 0 to 100, and the valve opening driving current is an electric current value required for changing the valve opening ratio of the valve body 72 of the ejection amount regulating section 70 from 0 to 100. For example, when a motor that constitutes the ejection amount regulating section 70 is deteriorated, an electric current value for rotating the valve body 72 increases and the valve opening driving current or the valve opening driving time increases. The state observation section 600 of this embodiment observes the valve opening driving time as the state of the ejection amount regulating section 70. As shown in FIG. 24, the valve opening driving time at an observation time t2*i* is larger than the valve opening driving time at an observation time t1*i*. Therefore, deterioration of the ejection amount regulating section 70 is in further progress at the observation time t2*i* than at the observation time t1*i*.

The prediction section 700 predicts the service life arrival time of the ejection amount regulating section 70 from the result of the state observation by the state observation section 600. In this embodiment, the prediction section 700 predicts the service life of the ejection amount regulating section 70 by predicting a time when the valve opening driving time exceeds a seventh determination value Pj7. The prediction section 700 can predict the service life arrival time of the ejection amount regulating section 70 using, for example, an increase history of the valve opening driving time in the same manner as predicting the first service life arrival time using the increase history of the first arrival electric power amount in the first embodiment.

In this embodiment, in Step S445, the control unit 500 determines whether or not the third service life arrival time is within the shaping time. That is, in this embodiment, the control unit 500 determines whether or not the service life arrival time of the ejection amount regulating section 70 is within the shaping time in Step S445. When it is determined that the third service life arrival time is within the shaping time in Step S445, in Step S450, the control unit 500 controls the notification section 800 to notify a user of information indicating that the service life arrival time of the ejection amount regulating section 70 is within the shaping time.

According also to the three-dimensional shaping apparatus 100i of the ninth embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, when the service life arrival time of the ejection amount regulating section 70 is within the shaping time, the control unit 500 controls the notification section 800 to make a notification of information regarding the service life of the ejection amount regulating section 70. According to this, a user can, for example, replace a deteriorated part constituting the ejection amount regulating section 70 with another part that is not deteriorated before shaping a three-dimensional shaped article based on the information notified by the notification section 800. Therefore, even when deterioration of the ejection amount regulating section 70 is in progress, a possibility that replacement of the part is needed in the middle of shaping of a three-dimensional shaped article is decreased, and deterioration of shaping quality due to suspension or resumption of shaping accompanying the replacement of the part is suppressed.

In another embodiment, the state observation section 600 may, for example, observe the state of the ejection amount regulating section 70 based on a relationship between the valve opening driving time and the valve opening driving current. In that case, for example, the degree of divergence of a plot of a relationship between the measured valve opening driving time and valve opening driving current from a plot of a relationship between the valve opening driving time and the valve opening driving current when changing the valve opening ratio of the unused ejection amount regulating section 70 from 0 to 100 is observed as the state of the ejection amount regulating section 70, and a time when the degree of divergence exceeds a specific value may be predicted as the service life arrival time of the ejection amount regulating section 70. In addition, for example, an electric current value or an electric power amount required for changing the valve opening ratio from 0 to 100 may be observed as the state of the ejection amount regulating section 70.

In another embodiment, for example, in Step S440, the service life arrival time of the suction section 80 may be predicted as the third service life arrival time. In that case, the state observation section 600, for example, may observe a time, an electric current value, an electric power amount, or the like required for forward movement or backward movement of the plunger 82 as the state of the plunger 82, or may observe the state of the plunger 82 based on a relationship between a time and an electric current value required for forward movement or backward movement of the plunger 82. Further, the prediction section 700 can predict the service life arrival time of the plunger 82 using an increase history in the same manner as predicting the service life arrival time of the ejection amount regulating section 70. In that case, further, when it is determined that the service life arrival time of the suction section 80 is within the shaping time in Step S445, a user is notified of information regarding the service life of the suction section 80 in Step S450. According to this, the user can, for example, replace a deteriorated part constituting the suction section 80 with another part that is not deteriorated before shaping a three-dimensional shaped article based on the notified information.

J. Other Embodiments (J-1) In the above embodiment, the state observation section 600 calculates the first arrival electric power amount to be predicted at a stage before the heater temperature arrives at the determination temperature. On the other hand, for example, the first arrival electric power amount as an actual measurement value may be calculated after the heater temperature arrives at the determination temperature Tj. Further, similarly, the state observation section 600 may calculate the second arrival electric power amount as an actual measurement value after the motor rotational speed arrives at the determination rotational speed Rj.

(J-2) In the above embodiment, the state observation section 600 observes the first arrival electric power amount as the state of the heater 35. On the other hand, the state observation section 600 may observe not the first arrival electric power amount, but the first arrival time required for the temperature of the heater 35 to arrive at the determination temperature as the state of the heater 35. Specifically, the state observation section 600 can observe the first arrival time based on the change in the heater temperature with respect to the operation time of the heater 35 in the same manner as the observation of the first arrival electric power amount shown in FIG. 5. Further, in that case, the prediction section 700 may predict the first service life arrival time by predicting a time when the first arrival time exceeds the determination value. Specifically, the prediction section 700 can predict the first service life arrival time using the increase history of the first arrival time in the same manner as the increase history of the first arrival electric power amount shown in FIG. 6. Further, the state observation section 600 need not observe the first arrival electric power amount or the first arrival time as the state of the heater 35. For example, the state observation section 600 may observe the cumulative electric power consumption of the heater 35 as the state of the heater 35. In that case, the prediction section 700 may predict the first service life arrival time by predicting a time when the cumulative electric power consumption of the heater 35 exceeds the first determination value. Further, similarly, the state observation section 600 may observe not the second arrival electric power amount, but the second arrival time required for the rotational speed of the drive motor 32 to arrive at the determination rotational speed or the cumulative electric power consumption of the drive motor 32 as the state of the drive motor 32. Further, for example, by measuring the ejection amount of the shaping material, the plasticization amount of the material by the screw 40 is calculated, and the plasticization amount of the material with respect to the control value of the rotational speed of the drive motor 32 or the motor electric power amount may be observed.

(J-3) In the above embodiment, when the service life arrival time is within the shaping time, the control unit 500 shapes a three-dimensional shaped article after receiving a shaping start instruction from a user. On the other hand, the control unit 500 may shape a three-dimensional shaped article without receiving a shaping start instruction from a user. The control unit 500, for example, may shape a three-dimensional shaped article after it is determined that the service life arrival time is within the shaping time, and then a predetermined time elapses.

(J-4) In the above embodiment, the screw 40 is a flat screw. On the other hand, the screw 40 may be not a flat screw, but another screw. The screw 40 may be, for example, an inline screw that is rotated by the drive motor 32. In that case, the plasticizing section 30 need not include the barrel 50.

(J-5) In the above embodiment, the notification section 800 is constituted by a liquid crystal monitor that displays visual information. On the other hand, the notification section 800 need not be constituted by a liquid crystal monitor. The notification section 800 may be constituted, for example, as a speaker that makes a notification of voice information. Further, the notification section 800 may be constituted by a telecommunications device that makes a notification of information by transmitting a message to another computer or the like. Further, the notification section 800 may be configured to make a notification of information by using a plurality of notification units as described above in combination.

(J-6) In the above embodiment, two bar-shaped heaters 35 are embedded in the barrel 50. On the other hand, the heater 35 need not be embedded in the barrel 50. For example, the heater 35 may be provided in the screw 40. Further, the number of heaters 35 may be one or may be three or more.

(J-7) In the above embodiment, the shaping unit 200 plasticizes a material in a pellet form to form a shaping material and shapes a three-dimensional shaped article by stacking the shaping material on the stage 300. On the other hand, the shaping unit 200, for example, may be configured to shape a three-dimensional shaped article using a so-called FDM system in which a material in a filament form is plasticized to form a shaping material and a three-dimensional shaped article is shaped by stacking the shaping material on the stage 300.

(J-8) In the above embodiment, the control unit 500 exhibits a function as the state observation section 600, the prediction section 700, and the instruction acquisition section 750. On the other hand, the control unit 500 need not exhibit a function as the state observation section 600, the prediction section 700, and the instruction acquisition section 750. For example, the state observation section 600 and the prediction section 700 need not be constituted as part of the function of the control unit 500, but each of the state observation section 600 and the prediction section 700 may be constituted by a computer including one or more processors, a main storage device, and an input/output interface for performing signal input/output to/from the outside. Further, the instruction acquisition section 750 may be constituted as an acquisition section that acquires a shaping start instruction through an electric wiring or wireless communication as a separate body from the control unit 500, or may be constituted as a computer or the like including such an acquisition section. In that case, the control unit 500 can acquire a shaping start instruction acquired by the instruction acquisition section 750 through, for example, an electric wiring or wireless communication.

(J-9) In the above fifth to ninth embodiments, in the three-dimensional shaping process shown in FIG. 14, the first service life arrival time and the third service life arrival time are predicted. On the other hand, in the fifth to ninth embodiments, for example, the second service life arrival time and the third service life arrival time may be predicted, or the first service life arrival time, the second service life arrival time, and the third service life arrival time may be predicted. Further, in a single three-dimensional shaping process, as the third service life arrival time, for example, the service life of a plurality of members as shown in the fifth to ninth embodiments may be predicted. In addition, the prediction of the third service life arrival time may be performed before the prediction of the first service life arrival time or the second service life arrival time, or may be performed simultaneously with the first service life arrival time or the second service life arrival time.

K. Other Aspects

The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to the first aspect of the present disclosure, a three-dimensional shaping apparatus is provided. The three-dimensional shaping apparatus includes a plasticizing section that includes a drive motor, a heater, and a screw rotated by the drive motor and that plasticizes a material to form a shaping material, an ejection section that ejects the shaping material toward a stage, a moving mechanism section that changes a relative position of the ejection section to the stage, a state observation section that observes a state of the drive motor or the heater, a prediction section that predicts a service life arrival time of the drive motor or the heater from an observation result of the state observation section, a notification section, and a control unit that controls the plasticizing section and the moving mechanism section to shape a three-dimensional shaped article based on shaping data. The control unit makes service life determination to determine whether or not the service life arrival time predicted by the prediction section is within a shaping time estimated based on the shaping data, and makes a notification of service life information representing a result of the service life determination by controlling the notification section before shaping the three-dimensional shaped article when the service life arrival time is within the shaping time.

According to such an aspect, a user can, for example, replace a deteriorated drive motor or heater with another drive motor or heater that is not deteriorated before shaping a three-dimensional shaped article based on the service life information notified by the notification section. Therefore, even when deterioration of the drive motor or the heater is in progress, a possibility that replacement of the drive motor or the heater is needed in the middle of shaping of a three-dimensional shaped article is decreased, and deterioration of shaping quality due to suspension or resumption of shaping accompanying the replacement of the drive motor or the heater is suppressed.

(2) In the three-dimensional shaping apparatus of the above aspect, the state observation section may observe a first arrival time required for a temperature of the heater to arrive at a determination temperature or a first arrival electric power amount required for a temperature of the heater to arrive at the determination temperature as a state of the heater, and the prediction section may predict a first service life arrival time when the heater arrives at the end of its service life as the service life arrival time by predicting a time when the first arrival time or the first arrival electric power amount exceeds a first determination value. According to such an aspect, the state of the heater can be easily observed when the temperature of the heater is increased, and the service life arrival time of the heater can be efficiently observed.

(3) In the three-dimensional shaping apparatus of the above aspect, a temperature acquisition section that acquires an ambient temperature being a temperature outside the plasticizing section may be included, and the control unit may determine the first determination value according to the ambient temperature. According to such an aspect, the effect of the ambient temperature is added to the prediction of the first service life arrival time by the prediction section, so that the first service life arrival time is more appropriately predicted. Therefore, a possibility that replacement of the heater is needed in the middle of shaping of a three-dimensional shaped article is further decreased, and deterioration of shaping quality due to suspension or resumption of shaping accompanying the replacement of the heater is further suppressed.

(4) In the three-dimensional shaping apparatus of the above aspect, the state observation section may observe a second arrival time required for a rotational speed of the drive motor to arrive at a determination rotational speed or a second arrival electric power amount required for a rotational speed of the drive motor to arrive at the determination rotational speed as a state of the drive motor, and the prediction section may predict a second service life arrival time when the drive motor arrives at the end of its service life as the service life arrival time by predicting a time when the second arrival time or the second arrival electric power amount exceeds a second determination value. According to such an aspect, the state of the drive motor can be easily observed when increasing the rotational speed of the drive motor, and the service life arrival time of the drive motor can be efficiently observed.

(5) In the three-dimensional shaping apparatus of the above aspect, a temperature acquisition section that acquires an ambient temperature being a temperature outside the plasticizing section may be included, and the control unit may determine the second determination value according to the ambient temperature. According to such an aspect, the effect of the ambient temperature is added to the prediction of the second service life arrival time by the prediction section, so that the second service life arrival time is more appropriately predicted. Therefore, a possibility that replacement of the drive motor is needed in the middle of shaping of a three-dimensional shaped article is further decreased, and deterioration of shaping quality due to suspension or resumption of shaping accompanying the replacement of the drive motor is further suppressed.

(6) In the three-dimensional shaping apparatus of the above aspect, an instruction acquisition section that acquires a shaping start instruction to start shaping the three-dimensional shaped article from a user may be included, and when the service life arrival time is within the shaping time, the control unit may make a notification of the service life information via the notification section, and thereafter acquire the shaping start instruction via the instruction acquisition section, and then, shape the three-dimensional shaped article. According to such an aspect, a user can, for example, make a shaping start instruction after replacing the deteriorated drive motor or heater with another drive motor or heater that is not deteriorated, and can start shaping a three-dimensional shaped article. Therefore, even when deterioration of the drive motor or the heater is in progress, a possibility that replacement of the drive motor or the heater is needed in the middle of shaping of a three-dimensional shaped article is further decreased, and deterioration of shaping quality due to suspension or resumption of shaping accompanying the replacement of the drive motor or the heater is further suppressed.

(7) In the three-dimensional shaping apparatus of the above aspect, the control unit may acquire first shaping data and second shaping data as the shaping data, and the control unit may determine whether or not the service life arrival time is within a second shaping time estimated based on the second shaping data when the service life arrival time is within a first shaping time estimated based on the first shaping data in the service life determination. According to such an aspect, even if the first service life arrival time is within the first shaping time, when the first service life arrival time is not within the second shaping time, the control unit can shape a three-dimensional shaped article according to the second shaping data. Therefore, the heater can be used for a longer period of time until the heater is replaced with a new one.

(8) In the three-dimensional shaping apparatus of the above aspect, when the service life arrival time is not within the second shaping time, the control unit may make a notification of the service life information indicating that the service life arrival time is not within the second shaping time by controlling the notification section before shaping the three-dimensional shaped article. According to such an aspect, a user can, for example, make a shaping start instruction to start shaping a three-dimensional shaped article according to the second shaping data for the control unit based on the service life information. Therefore, the heater can be used for a longer period of time until the heater is replaced with a new one.

(9) In the three-dimensional shaping apparatus of the above aspect, the screw may rotate around a rotational axis and have a grooved face with a groove formed therein, and the plasticizing section may include a barrel opposed to the grooved face. According to such an aspect, the plasticizing section can be miniaturized, and therefore, the three-dimensional shaping apparatus can be miniaturized.

(10) According to the second aspect of the present disclosure, a three-dimensional shaped article production method for shaping a three-dimensional shaped article by plasticizing a material to form a shaping material using a plasticizing section including a drive motor, a heater, and a screw rotated by the drive motor and ejecting the shaping material from an ejection section toward a stage is provided. This production method includes a first step of observing a state of the drive motor or the heater, a second step of predicting a service life arrival time of the drive motor or the heater from an observation result of the state, a third step of making service life determination to determine whether or not the predicted service life arrival time is within a shaping time estimated based on shaping data, a fourth step of making a notification of service life information that is a result of the service life determination before shaping the three-dimensional shaped article when the service life arrival time is within the shaping time, and a fifth step of shaping the three-dimensional shaped article by controlling the plasticizing section and a moving mechanism section that changes a relative position of the ejection section to the stage according to the shaping data.

According to such an aspect, a user can, for example, replace a deteriorated drive motor or heater with another drive motor or heater that is not deteriorated before shaping a three-dimensional shaped article based on the notified service life information. Therefore, even when deterioration of the drive motor or the heater is in progress, a possibility that replacement of the drive motor or the heater is needed in the middle of shaping of a three-dimensional shaped article is decreased, and deterioration of shaping quality due to suspension or resumption of shaping accompanying the replacement of the drive motor or the heater is suppressed.

The present disclosure is not limited to the above-mentioned three-dimensional shaping apparatus and three-dimensional shaped article production method, and can be realized in various forms. For example, it can be realized in forms such as a method for controlling a three-dimensional shaping apparatus, a computer program for shaping a three-dimensional shaped article, and a recording medium, which is not temporary but is tangible, and in which a computer program has been recorded.

What is claimed is:

1. A three-dimensional shaping apparatus, comprising:
a plasticizing section that includes a drive motor, a heater, and a screw rotated by the drive motor and that plasticizes a material to form a shaping material;
an ejection section that ejects the shaping material toward a stage;
a moving mechanism section that changes a relative position of the ejection section to the stage;
a state observation section that observes a state of the drive motor or the heater;
a prediction section that predicts a service life arrival time of the drive motor or the heater from an observation result of the state observation section;
a notification section; and
a control unit that controls the plasticizing section and the moving mechanism section to shape a three-dimensional shaped article based on shaping data, wherein the control unit
makes service life determination to determine whether or not the service life arrival time predicted by the prediction section is within a shaping time estimated based on the shaping data, and
makes a notification of service life information representing a result of the service life determination by controlling the notification section before shaping the three-dimensional shaped article when the service life arrival time is within the shaping time.

2. The three-dimensional shaping apparatus according to claim 1, wherein
the state observation section observes a first arrival time required for a temperature of the heater to arrive at a determination temperature or a first arrival electric power amount required for a temperature of the heater to arrive at the determination temperature as a state of the heater, and
the prediction section predicts a first service life arrival time when the heater arrives at the end of its service life as the service life arrival time by predicting a time when the first arrival time or the first arrival electric power amount exceeds a first determination value.

3. The three-dimensional shaping apparatus according to claim 2, further comprising a temperature acquisition section that acquires an ambient temperature being a temperature outside the plasticizing section, wherein
the control unit determines the first determination value according to the ambient temperature.

4. The three-dimensional shaping apparatus according to claim 1, wherein
the state observation section observes a second arrival time required for a rotational speed of the drive motor to arrive at a determination rotational speed or a second arrival electric power amount required for a rotational speed of the drive motor to arrive at the determination rotational speed as a state of the drive motor, and
the prediction section predicts a second service life arrival time when the drive motor arrives at the end of its service life as the service life arrival time by predicting a time when the second arrival time or the second arrival electric power amount exceeds a second determination value.

5. The three-dimensional shaping apparatus according to claim 4, further comprising a temperature acquisition section that acquires an ambient temperature being a temperature outside the plasticizing section, wherein
the control unit determines the second determination value according to the ambient temperature.

6. The three-dimensional shaping apparatus according to claim 1, further comprising an instruction acquisition section that acquires a shaping start instruction to start shaping the three-dimensional shaped article from a user, wherein
when the service life arrival time is within the shaping time, the control unit makes a notification of the service life information via the notification section, and thereafter acquires the shaping start instruction via the instruction acquisition section, and then, shapes the three-dimensional shaped article.

7. The three-dimensional shaping apparatus according to claim 1, wherein
the control unit acquires first shaping data and second shaping data as the shaping data, and
the control unit determines whether or not the service life arrival time is within a second shaping time estimated based on the second shaping data when the service life arrival time is within a first shaping time estimated based on the first shaping data in the service life determination.

8. The three-dimensional shaping apparatus according to claim 7, wherein
when the service life arrival time is not within the second shaping time, the control unit makes a notification of the service life information indicating that the service life arrival time is not within the second shaping time by controlling the notification section before shaping the three-dimensional shaped article.

9. The three-dimensional shaping apparatus according to claim 1, wherein
the screw rotates around a rotational axis and has a grooved face with a groove formed therein, and
the plasticizing section includes a barrel opposed to the grooved face.

* * * * *